W. H. LONG.
MACHINE FOR PRODUCING CONTROLLERS FOR TYPOGRAPHIC MACHINES.
APPLICATION FILED DEC. 2, 1911.

1,207,576.

Patented Dec. 5, 1916.
14 SHEETS—SHEET 3.

WITNESSES:
John Darby
Rose Menk

INVENTOR
W. H. Long
BY
John D. Morgan
ATTORNEY

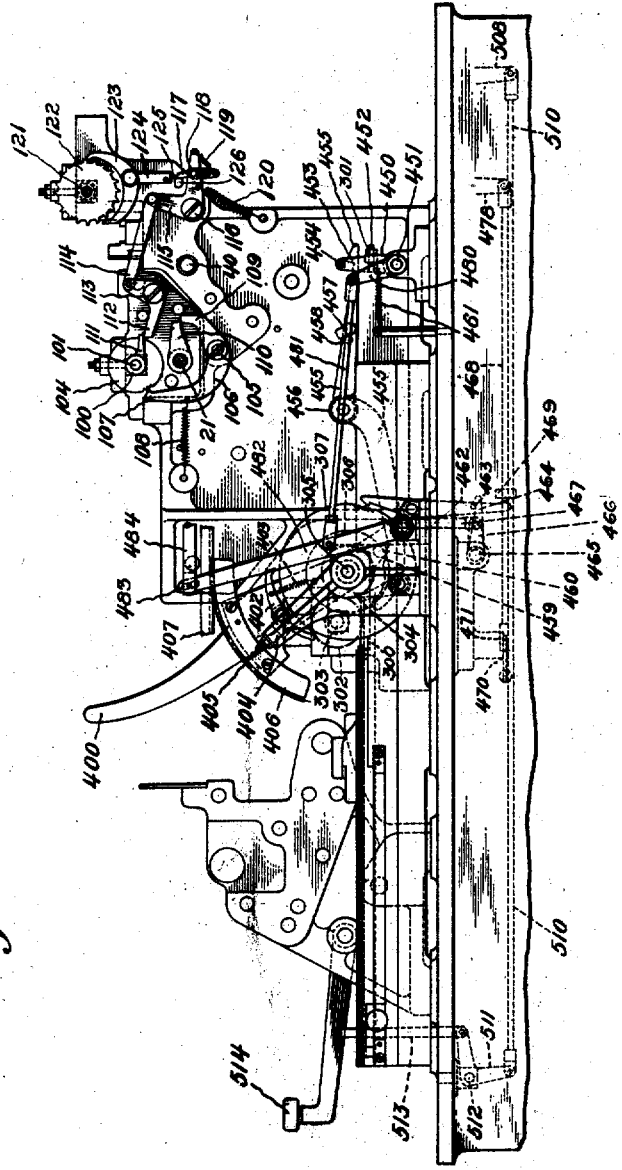

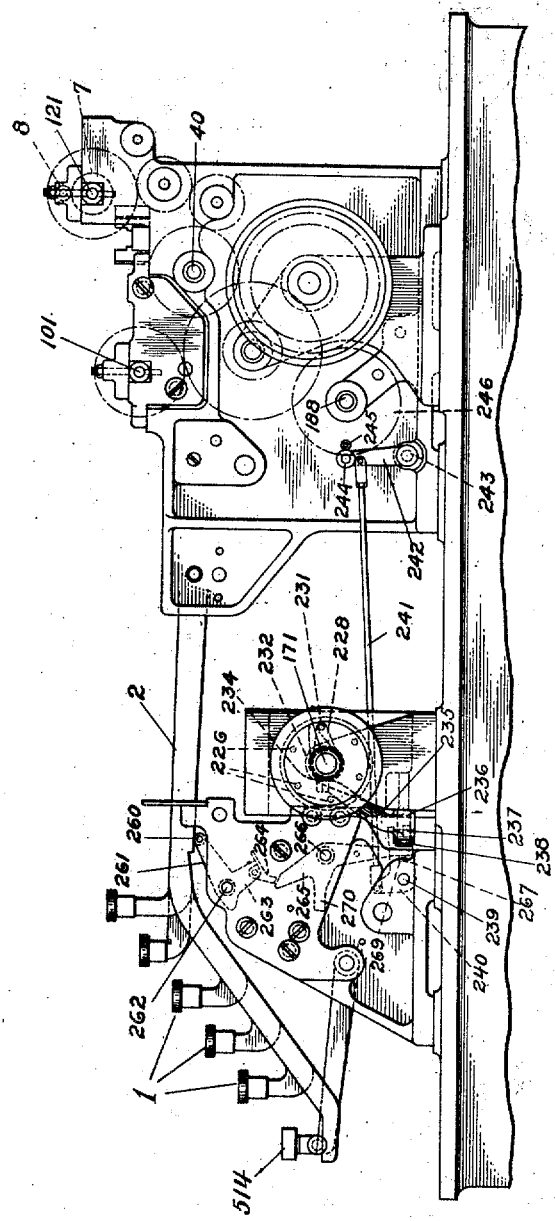

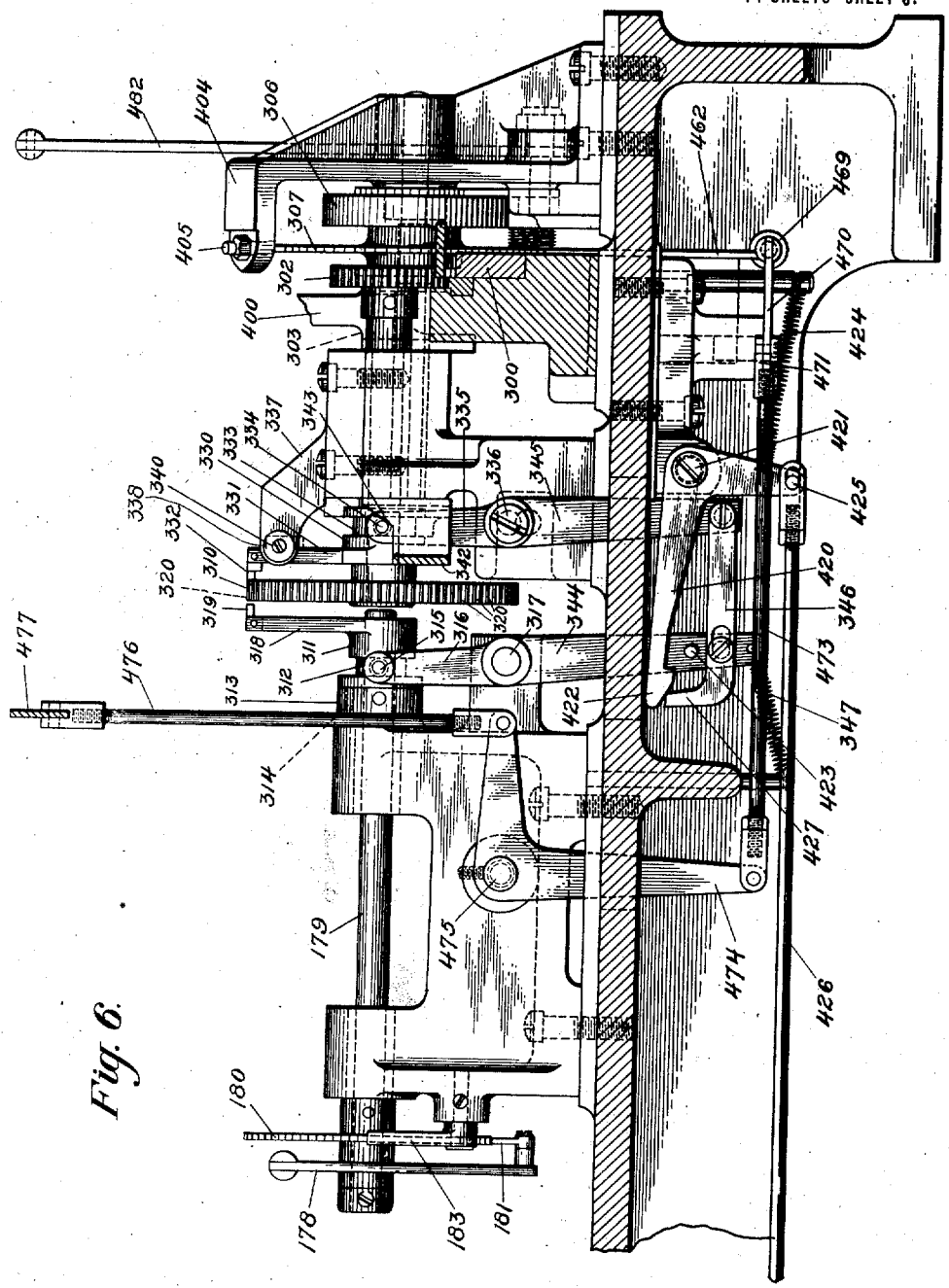

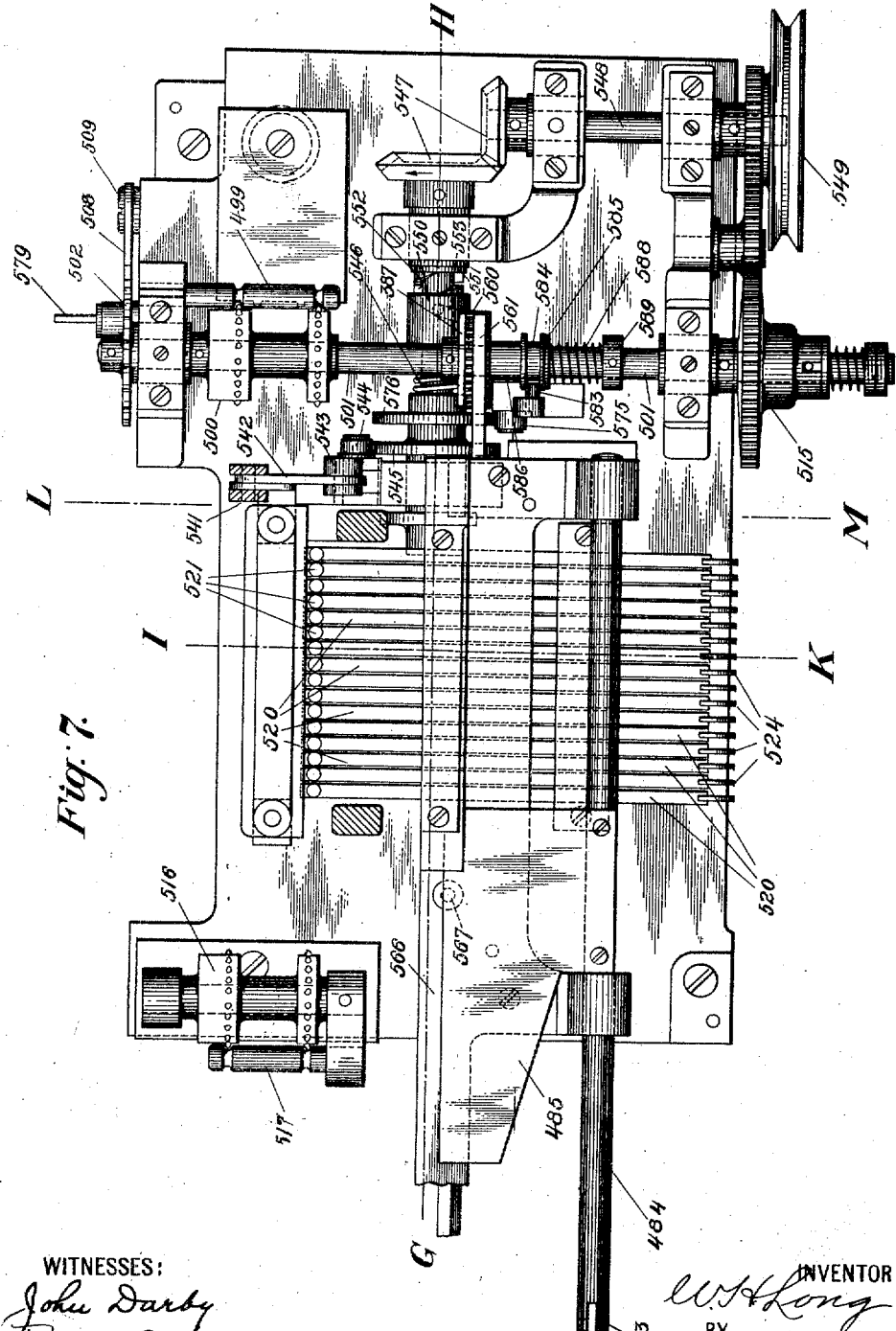

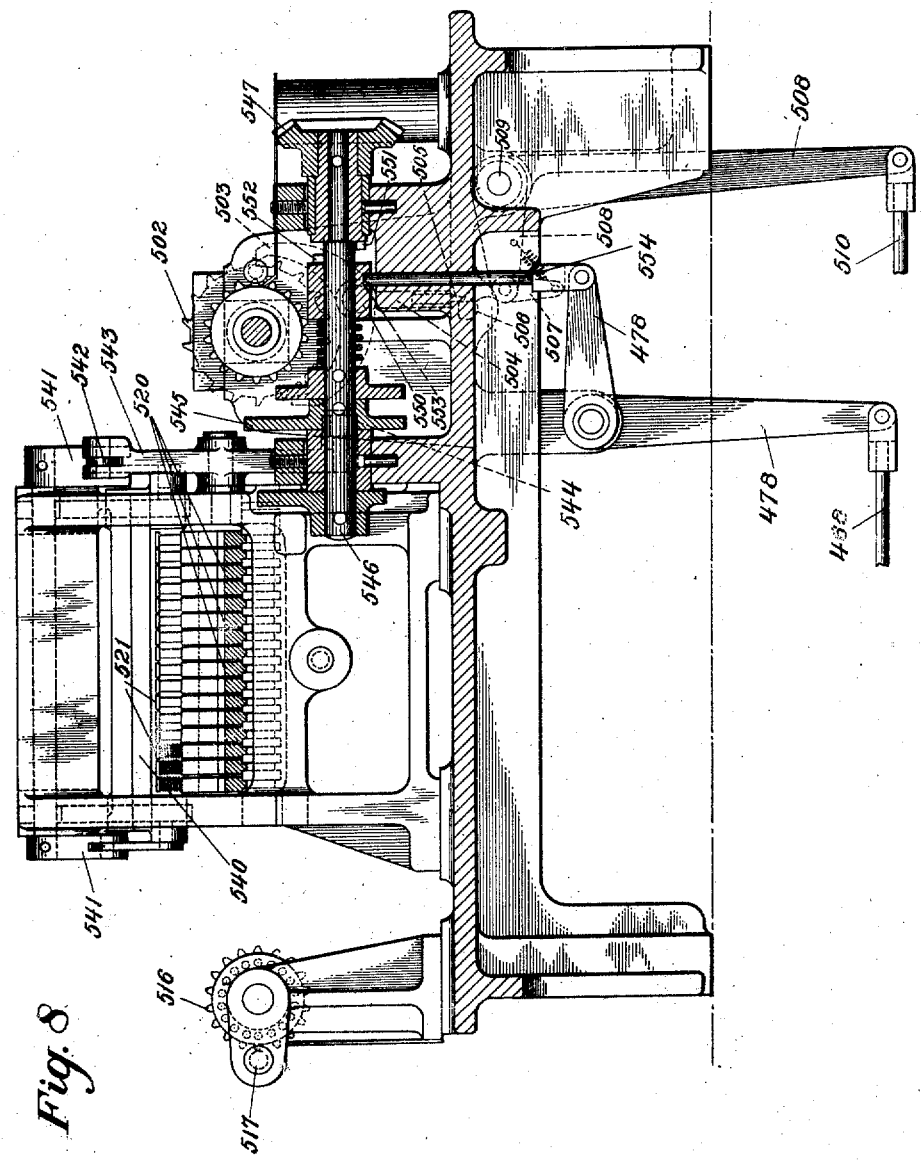

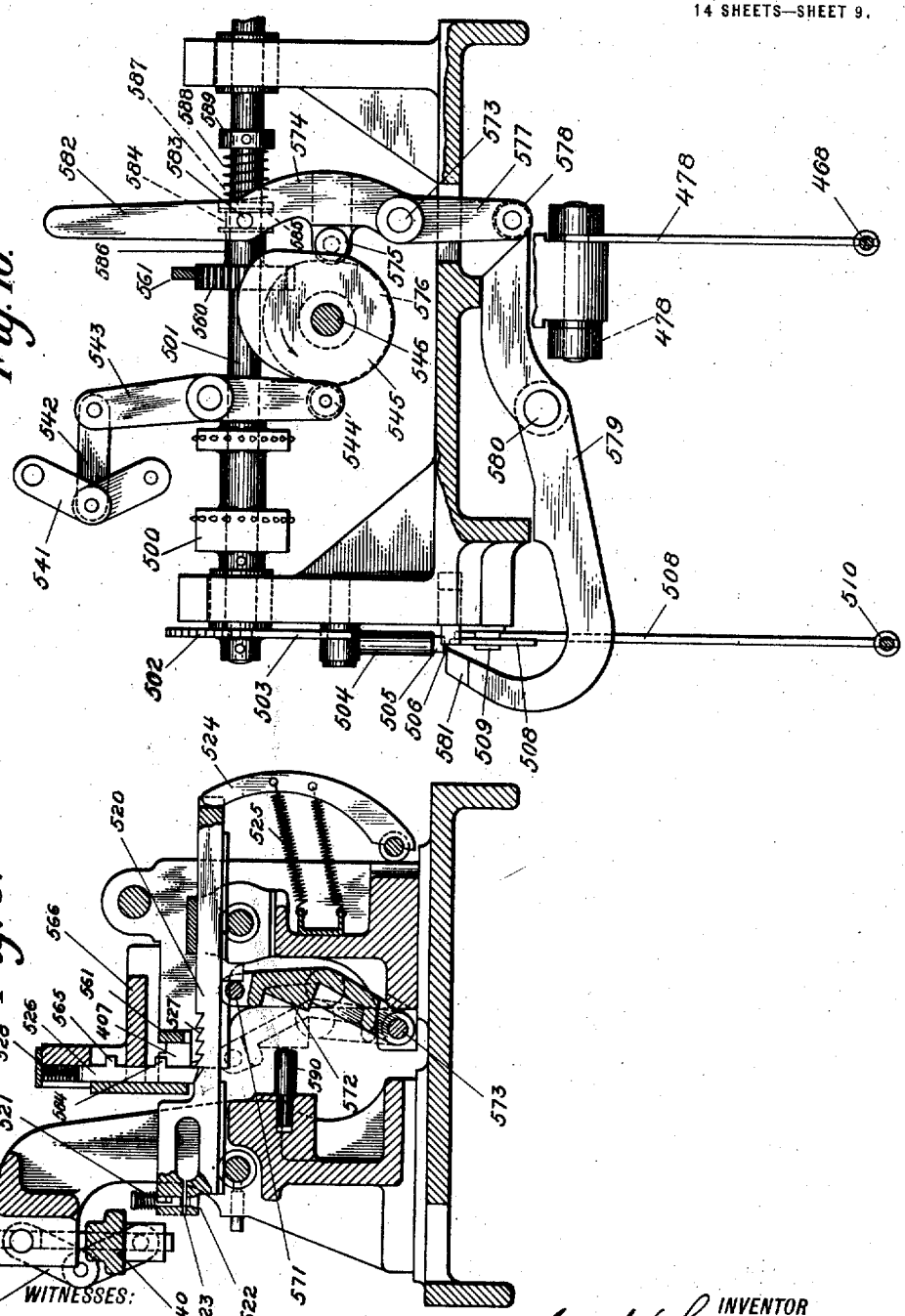

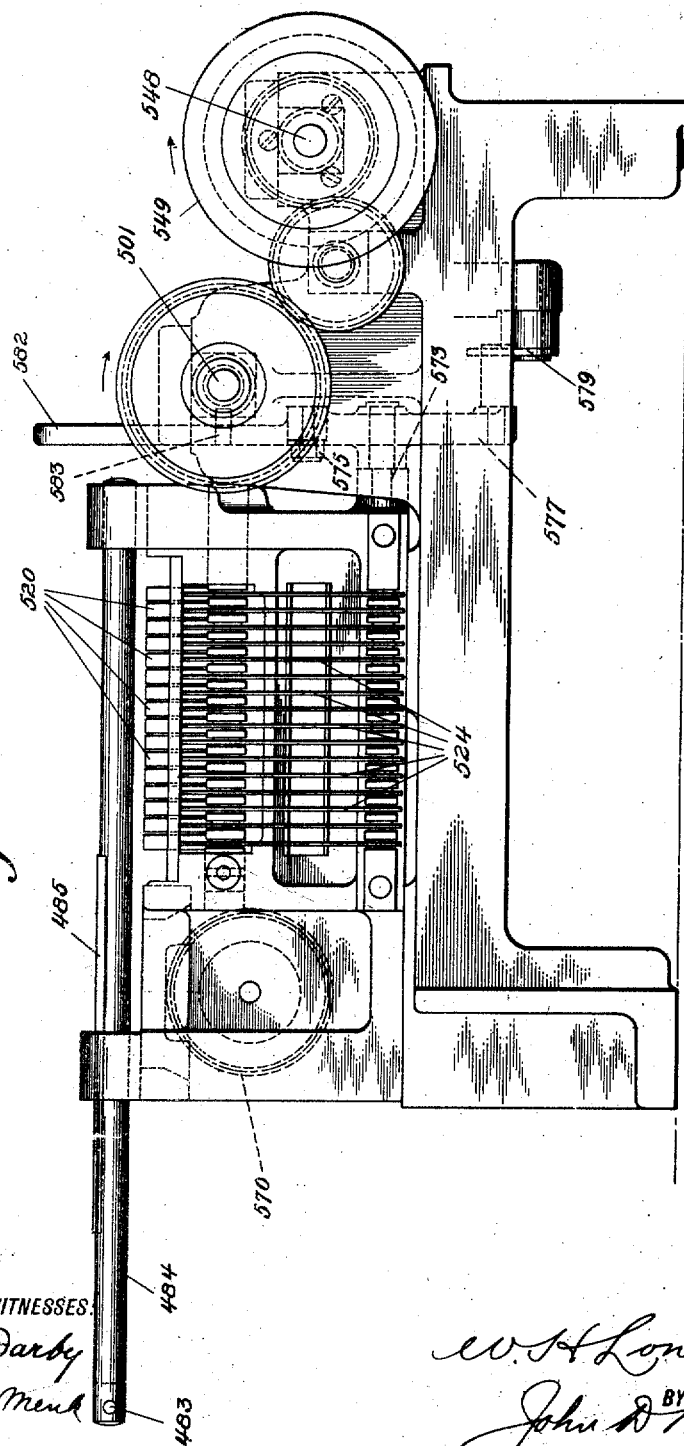

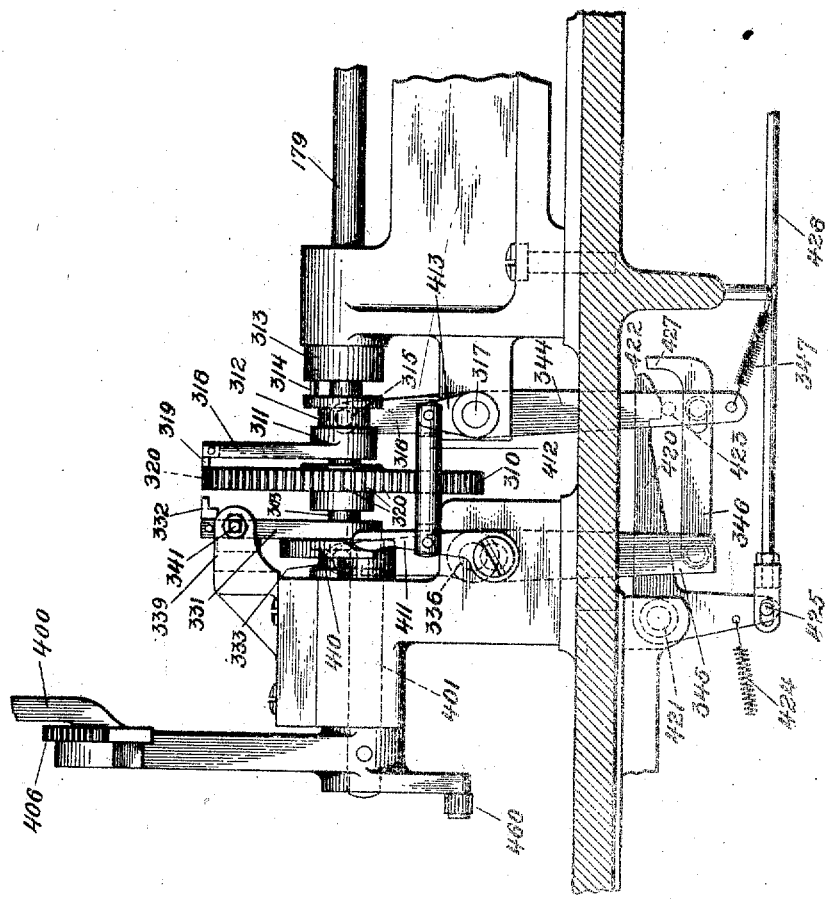

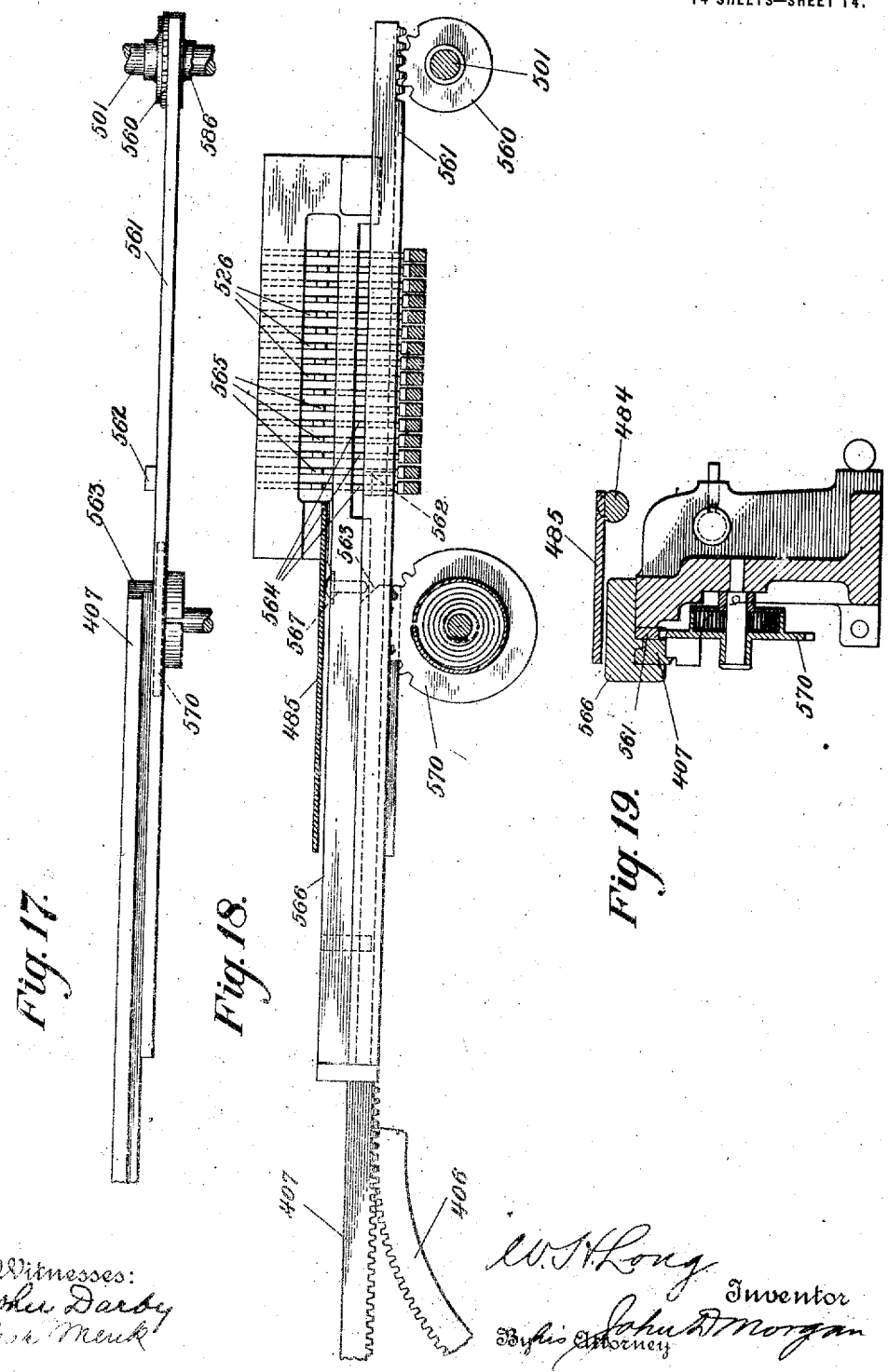

UNITED STATES PATENT OFFICE.

WILLIAM H. LONG, OF NEW YORK, N. Y., ASSIGNOR, BY MESNE ASSIGNMENTS, TO JAMES G. COFFIN, TRUSTEE.

MACHINE FOR PRODUCING CONTROLLERS FOR TYPOGRAPHIC MACHINES.

1,207,576.  Specification of Letters Patent.  Patented Dec. 5, 1916.

Application filed December 2, 1911. Serial No. 663,580.

*To all whom it may concern:*

Be it known that I, WILLIAM H. LONG, a citizen of the United States, residing at the borough of Brooklyn, in the county of Kings, city of New York, and State of New York, have invented certain new and useful Improvements in Machines for Producing Controllers for Typographic Machines, of which the following is a specification.

The invention relates to machines for making controllers for automatic typographic machines, and more particularly to machines for making marks or perforations in a strip or web, which perforations control the various functions of the typographic machines including the selection and impression of characters, the spacing for the characters, the word or interverbal spacing, the variation of the interverbal spaces to justify the line, and the shifting from one case or style of type to another and so on.

The various objects and advantages of the invention are in part set forth hereinafter and will in part be obvious to those skilled in the art and the means and mechanisms by which they are realized are set forth in the appended claims.

The invention consists in the novel parts, constructions, arrangements, combinations and improvements herein shown and described.

The accompanying drawings, referred to herein and forming a part hereof, illustrate one embodiment of the invention, the same serving in connection with the description herein to explain the principles of the invention.

Figure 1:
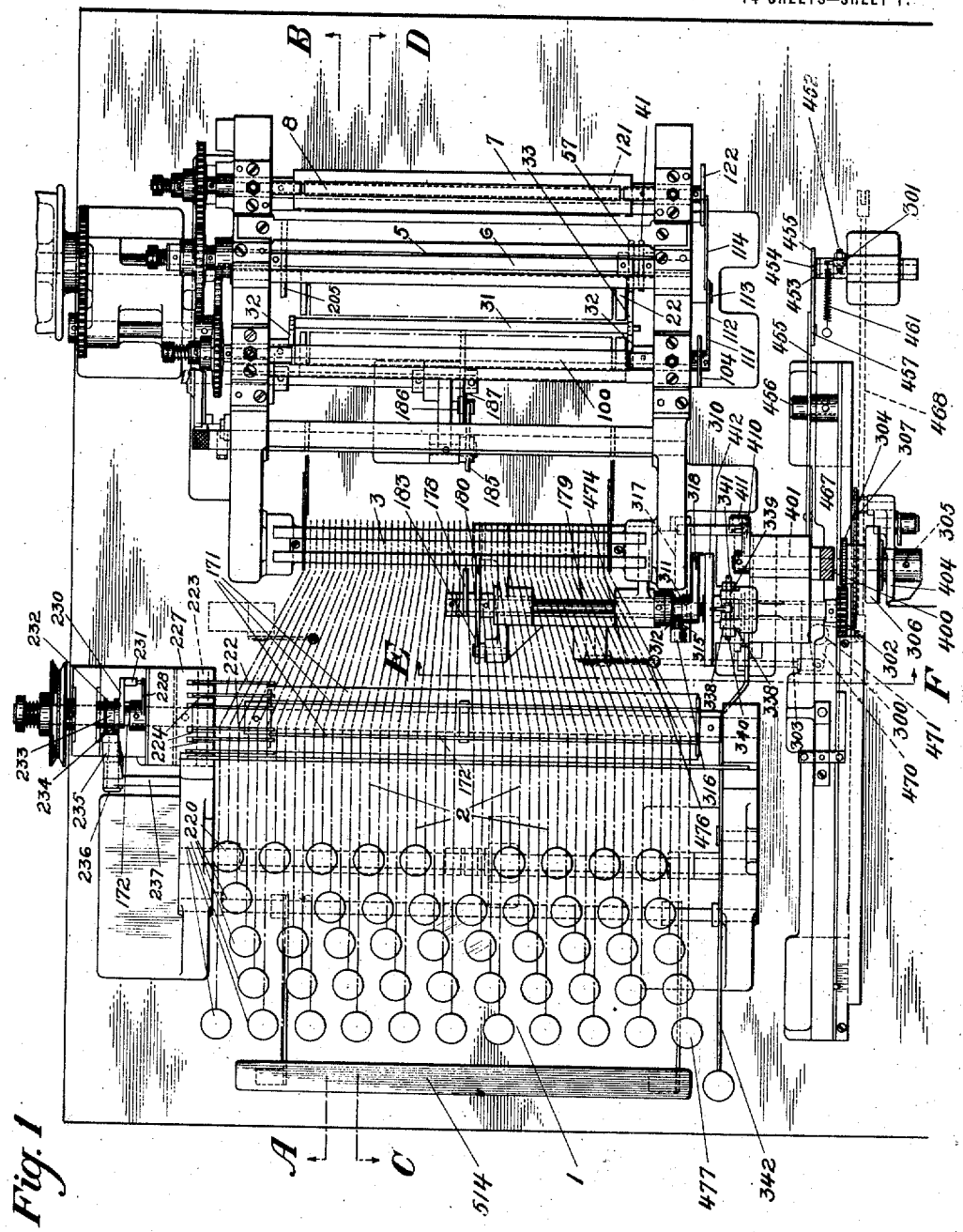
Figure 2:
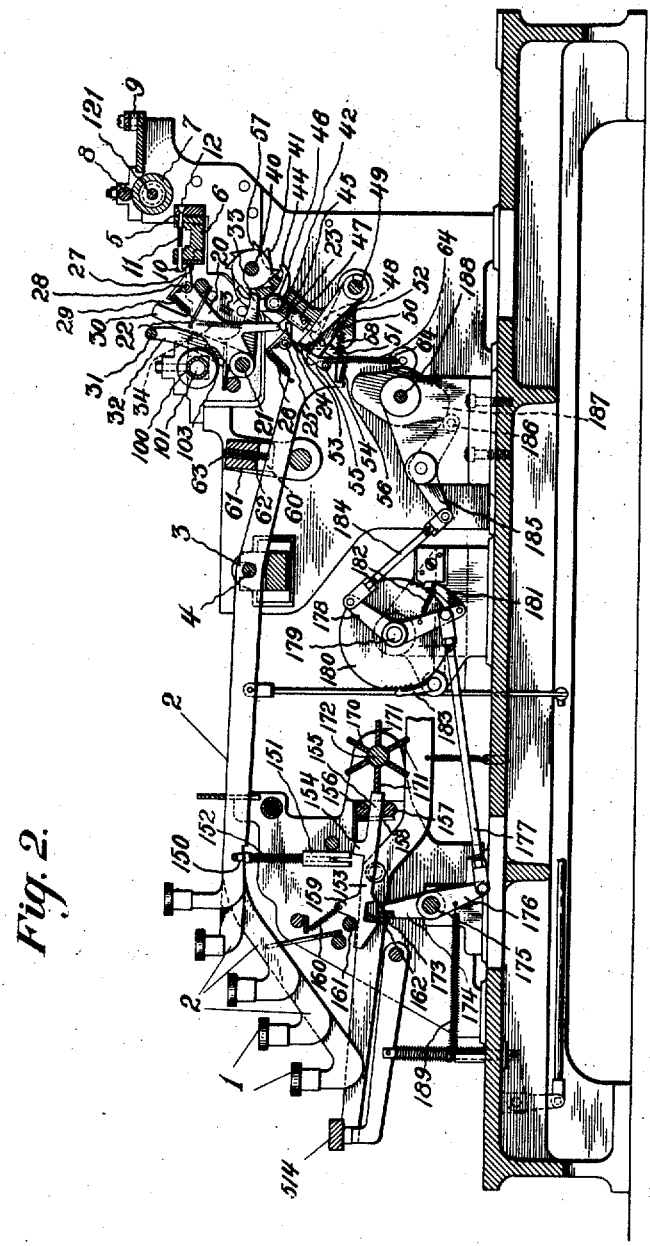
Figure 3:
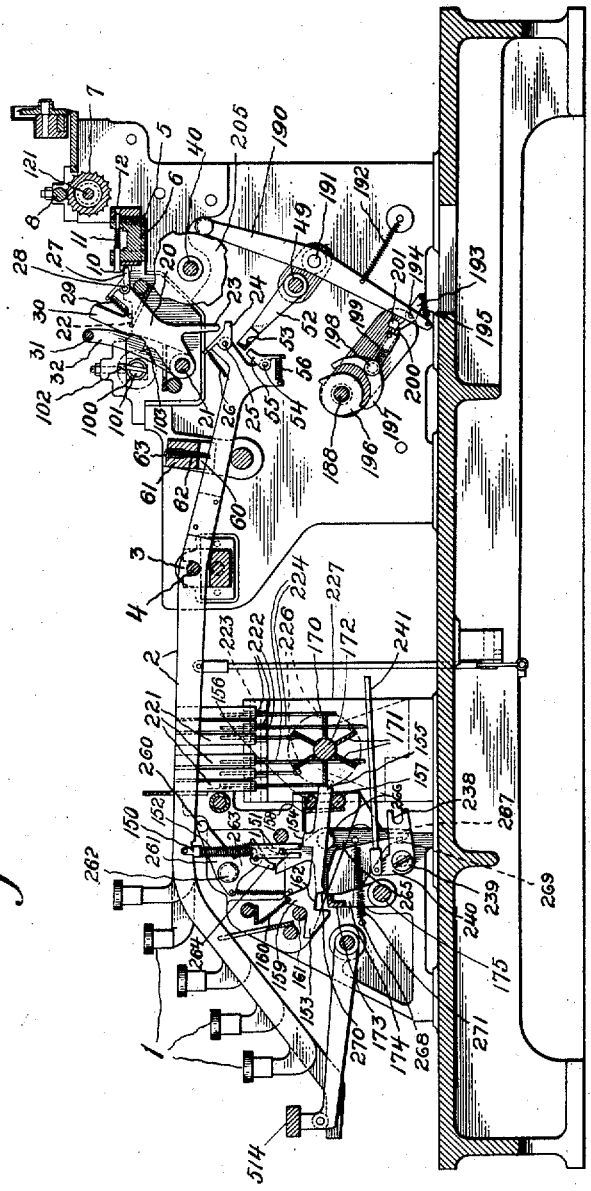
Figure 12:
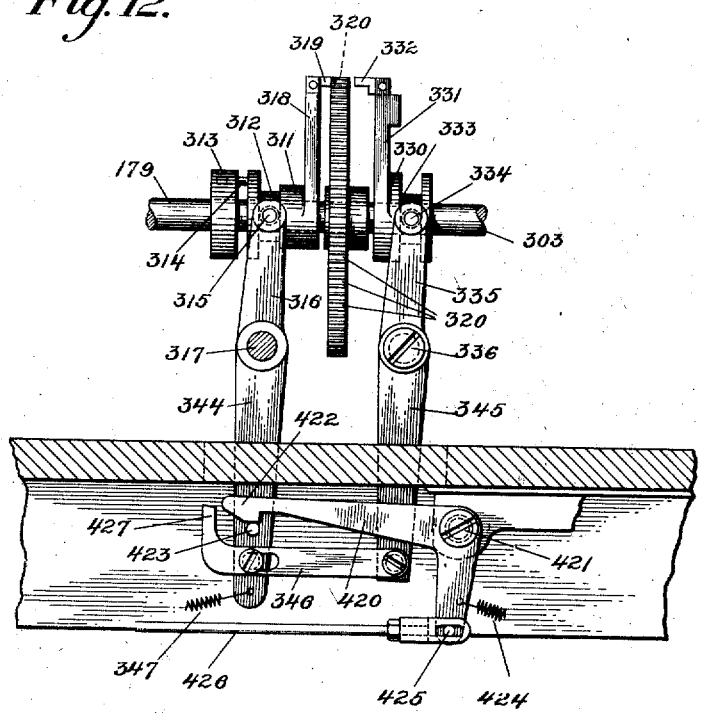
Figure 13:
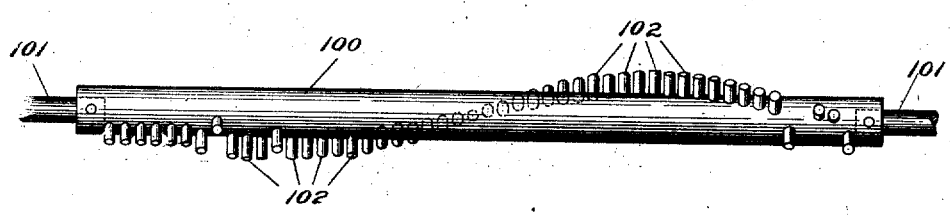
Figure 14:
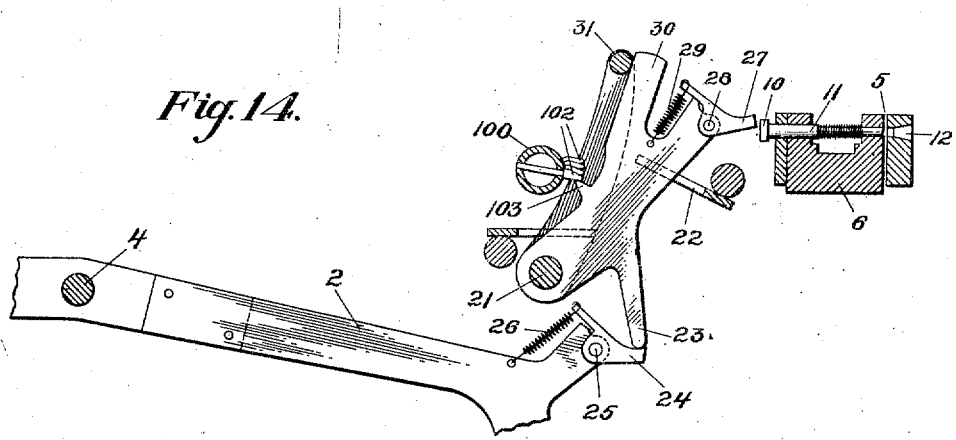
Figure 15:
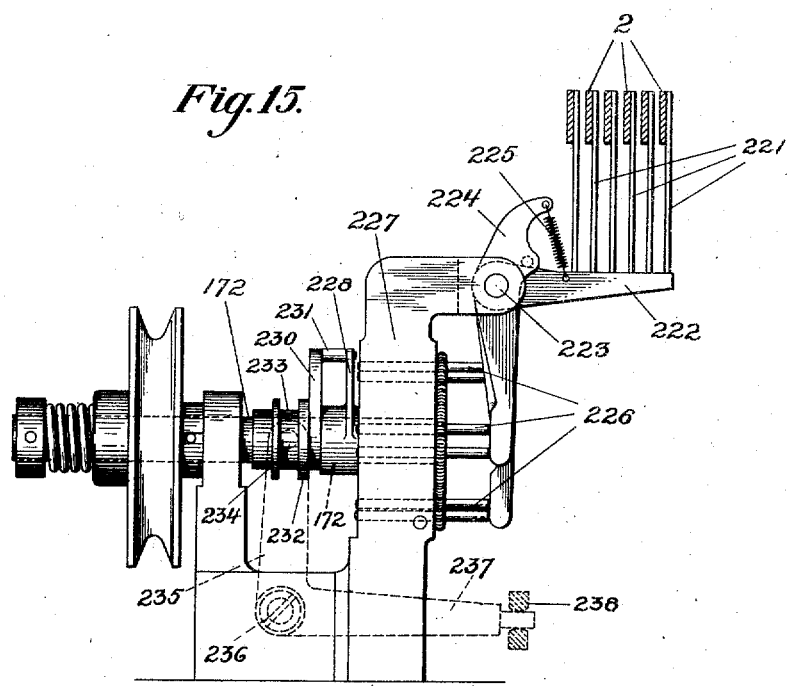

Of the drawings: Figure 1 is a top plan of a machine constructed in accordance with the principles of the invention with the justifying mechanism omitted for the sake of clearness; Fig. 2 is a section on the reference line C—D of Fig. 1 looking in the direction of the arrows; Fig. 3 is a section on the line A—B of Fig. 1 looking in the direction of the arrows; Fig. 4 is a side elevation looking at Fig. 1 from the right; Fig. 5 is a left hand side elevation corresponding to Fig. 1; Fig. 6 is a section elevation on the line E—F of Fig. 1 looking in the direction of the arrows; Fig. 7 is a top plan on the justifying mechanism; Fig. 8 is a partial section and partial elevation on the line G—H of Fig. 7; Fig. 9 is a section on the line I—K of Fig. 7; Fig. 10 is a section on the line L—M of Fig. 7; Fig. 11 is an elevation looking at Fig. 7 from the right side of the sheet; Fig. 12 is a fragmentary elevation corresponding to the central portion of Fig. 6 but showing the parts in a different position; Fig. 13 is a detail of the sequence counter; Fig. 14 is a fragmentary detail of the upper right hand portion of Fig. 2 showing the interponent in position to operate the punch; Fig. 15 is a fragmentary detail of the actuating mechanism for the shift controlling pins; Fig. 16 is a detail of the connections between the justifying lever and the unit counting mechanism whereby the unit counting mechanism is thrown out during the justifying operation; Fig. 17 is a fragmentary plan of the word space and justifying racks; Fig. 18 is an elevation corresponding to Fig. 17; and Fig. 19 is a detail of the restoring spring for the word space bar.

Referring by way of example to the embodiment of the invention, illustrated in the accompanying drawings, the same will be described in detail as setting forth the principles of the invention.

The machine includes mechanism for perforating the strip or sheet of paper or other material, the location or relation of such perforations coacting with the mechanism of the typewriting machine to control its operation. Said perforating mechanism comprises a key board 1, connected to a series of key levers 2. Said key levers are shown pivoted at 3 upon a suitable rod 4 or other means carried by the machine frame. The controller upon which the representations of the composed matter, and which consists of a strip or sheet of paper or other suitable material is passed through the passage 5 in the block 6 to be marked or perforated by punches or other marking devices. The controller passes between suitable feeding means, such as the sprocket feed rolls 7 and 8, engaging corresponding holes in the controller and which give the strip or sheet its feed at the proper time, and thence out past a cutting device 9 of any suitable form. Slidably carried in the block 6 are a series of punches 10 each of which is restored to or held in retracted position by suitable means as a spring 11, coiled thereabout. In the block 6 is a corresponding series of dies 12, whereby when a particular punch is operated, it passes into the die and makes a perforation in the strip or sheet in the passage 5.

The selection of the punches is controlled from the keyboard and according to certain features of the invention means are provided for delaying the making of a perforation by a selected punch for one key stroke, or until the selection of the next succeeding punch. By this means a high percentage of the errors of composition are eliminated, that is they do not appear in the controller at all, and the work of correction is reduced to a minimum. It will be understood that such errors as striking one key for another are usually recognized by the operator as soon as made, and as the perforation is not made until the next succeeding key is struck, he has opportunity to prevent the wrong perforation being made by substituting the selection of the correct punch for the wrong one before the next succeeding stroke. Means are also provided for allowing for conditions arising due to the striking of the same letter twice in succession, and to the necessary functions or operations of both the present machine and the typographic machine controlled by the controller with reference to the sequence of characters or functions in the typographic machine. These conditions, among others, are had in view in the mechanism whereby the punches are selected and are actuated to make the perforations.

In the embodied form of mechanism a series of interponents corresponding to the key levers of the machine are moved into position by the corresponding key levers to cause the punch to be actuated by the punch actuating means. As embodied, interponents 20 are mounted to swing loosely on a rock shaft 21. Said interponents are located between the teeth of a suitable guide plate 22 which serves to keep them in alinement with their respective punches. Each of said punch operating interponents (Figs. 2, 3 and 14) 20, as shown is provided with a downwardly extending arm 23, which arm is adapted to engage with a pivoted, spring pressed contact piece or pawl 24 mounted on the end of the corresponding key lever. Each of said contacts 24 is pivoted at 25, and is yieldingly held by a spring 26. Upon another arm of each interponent is mounted a pivoted spring pressed contact piece or pawl 27, pivoted at 28, and held under tension by a spring 29. Each interponent 20 carries also an arm 30 which coöperates with the actuating device therefor.

The actuating devices for the successive selected interponents as embodied comprise a universal bail or rod 31, carried on arms 32 fixed to the shaft 21. Fixed also to said shaft 21 is an arm 33. A spring 34 is connected to said arm and for convenience to a guide comb 22 for the purpose of restoring the universal bail 31 to position. Carried upon the machine frame is a frictionally driven shaft 40 which serves to actuate the bail 31, to operate the selected punch. Fixed on said shaft 40 is an escapement wheel 41, with which wheel coöperates an anchor escapement 42 having two escapement engaging arms 43 and 44, and a tail 45 extending from its pivot point 46. In said tail 45 of said anchor escapement, is mounted a slidable spring pressed latch 47 which engages with a face of a stationary stop 48 carried upon the machine frame. Carried upon the machine frame is a rock shaft 49, to which is fixed an arm 50 carrying pivotally mounted thereon a releasing finger 51, which is spring pressed against a pin stop by a spring 58. Fixed also upon said shaft 49 are arms 52 carrying a universal bar 53, which extends past the ends of all the key levers. Pivotally mounted at 54 on the end of each key lever is a pawl 55 acted upon by a spring 56. Carried upon said bail actuating shaft 40 and fixed thereto is a toothed wheel 57, a tooth on which engages with the arm 33 fixed to the bail carrying shaft 21. The key levers work in slots 60 former in a block 61 carried upon the machine frame. Each key lever is acted upon by a restoring spring 62, and each restoring spring has a tension adjusting screw 63. The universal escapement releasing bar 53 is restored by means of a spring 64 acting between the arm 50 and the machine frame.

The manner of operation of the devices so far described is substantially as follows: When a key lever 2 is depressed, it rocks about its pivot 3 against the action of its restoring spring 62. As the key lever so rocks, the pawl 24 engages the depending arm 23 upon the corresponding interponent 20, and swings it upwardly about the bail carrying shaft 21, upon which shaft the interponents are loosely mounted. Allowance for any variations in the travel of the end of the key lever and its interponent is made by reason of the spring and pivot mountings of the contact or pawl 24 which engages the interponent to raise it. It will be recalled that the previously selected interponent is in operative position both as to the punch actuating bail 31 and its own punch 10. As the key lever now being actuated moves upwardly, the pawl 55 engages the universal escapement operating bar 53, rocking said bar and also the shaft 49. The arm 50 also participates in this movement, and its finger 51 slides the spring pressed latch 47 of the tail 45 of the anchor escapement away from its stop. The escapement is then free to swing, releasing the bail actuating shaft 40 for a partial rotation equal in extent to the distance between two successive teeth of the escapement wheel 41. The escapement tooth which has just been released contacting with the other arm 44 of the anchor escapement swings it back in the opposite direction and the spring pressed latch 47 again engages its stop, and the escapement wheel and its shaft are thus brought to rest. In case the releasing finger 51 has not yet moved away, the swinging movement of the detaining latch 47 will now swing said finger 51 against its spring so that it will not prevent the latch engaging its stop.

The release and partial rotation of the bail actuating shaft 40 has caused the toothed wheel 57 to move the arm 33 downwardly and to swing the punch actuating bail 31 downwardly and to the right, see Fig. 2. It will be recalled that an interponent 20 stood lifted from out the bank of interponents, with its actuating arm 30 against the bail 31 and with its punch actuating pawl 27 on the head of its punch (see Fig. 14). As the bail and interponent so swing downwardly, said punch is driven into its die block and punches the paper. By reason of said punch actuating means 27 being pivotally mounted it slides or arcs sidewise off and by its punch, the punch being thus restored by its restoring spring 11, irrespective of any other or further movement of the interponent. This action has taken place during the upward swing of the tail of the key lever which has just been actuated, as the parts are so positioned and arranged that the bail 53 is actuated during the earlier part of the stroke. The continued upward movement of the key lever causes the interponent actuating pawl 24 to engage the depending arm 23 of the actuated interponent corresponding to the actuated key lever and raises it up into operative position with respect to the punch actuating bail 31 (see Fig. 14), said interponent following the bail upwardly as it returns from actuating the previously selected interponent and punch as just described. There will be no interference between the movements of the interponents and the bail, by reason of the pivoted spring mountings of the interponent actuating contact piece 24, and this is true where a letter is repeated and therefore the interponent just actuated is reset by its key lever. The key lever and the punch actuating device move freely thus coöperating but without interfering one with the other. As the interponent swings upwardly its punch actuating contact piece or pawl 27 will swing on its pivot 28, through the yielding of the spring 29, so that the head of the pawl 27 will snap by the head of the corresponding punch 10, and remain in position against the head of the punch (see Fig. 14) to actuate the punch upon the next succeeding operation of the punch actuating bail 31, as has already been described in connection with the preceding selected punch.

Means are provided for arranging the perforations in the strip or sheet to correspond to the functions and sequence of the typographic machine. In a typographic machine such as is shown and described in application for Patent Ser. No. 683,606 (renewal) filed May 12, 1904, the characters are arranged in a predetermined sequence upon the type carrier, which type carrier moves in an endless path. With such a machine, as many perforations may be made in a single transverse line in the controller strip for the characters of a composition as the number of characters occurring in succession in the composition which correspond to characters found each at a later point than the last preceding character in the order of sequence of the character upon the typographic machine. There is therefore required in the controller making machine mechanism for feeding the controller each time that there is a break in the sequence. That is, each time the sequence is departed from by the next succeeding character to be perforated being found at an earlier point in the order of sequence of the characters upon the typographic machine, there is a line feed of the controller strip. The embodied form of such mechanism comprises a cylinder 100 mounted upon a frictionally driven shaft 101 carried upon the machine frame. Fixed in the surface of said cylinder 100 is a helical series of pins 102 corresponding in number to the interponents. Each interponent 20 is provided with a tooth 103 in line with its corresponding pin in said helical series. As a particular interponent is selected and moves upward into operative position with respect to the operating bail 31 and its punch 10, the tooth 103 of said interponent will engage with the corresponding pin of series 102 on the cylinder 100. The angular relation of the respective pins about their shaft is sequentially the same as the sequential order of the character corresponding to the interponent and punch for the particular pin upon the typographic machine. Thus there will be one rotation of the cylinder 100 for each time that the number of perforations made passes through the sequence corresponding to that of the typographic machine, or when the same letter is repeated.

Fixed on an end of the shaft 101 is a ratchet wheel 104. Pivoted on the frame of the machine at 105 is a detent carrying arm 106, the detent 107 of which is adapted to pass into and out of engagement with said ratchet 104. Said detent arm 106 is normally held out of engagement with the ratchet wheel 104 by the spring 108. The tail 109 of said detent arm 106 engages with an arm 110 fixed upon the bail carrying rock shaft 21 heretofore described. It will thus be seen that each time the punch actuating bail 31 is moved by the rocking of its shaft 21, and the tooth 103 on the previously selected interponent 20 passes out of engagement with its pin 102 on the sequence cylinder 100, the arm 110 through the rocking of shaft 21 swings the detent tooth 107 into engagement with the ratchet wheel 104 to hold the cylinder 100 against rotation. As the next succeeding interponent comes up, and the tooth 103 thereon passes into position to engage the corresponding pin in said helical series 102, the arm 110 swinging in the opposite direction permits the detent 107 to pass out of engagement with the ratchet 104. The cylinder 100 is thus allowed to rotate until the pin in said helical series engages with the tooth 103 upon its corresponding interponent.

Fixed on the shaft 101 is an arm 111, which as it comes to the proper point in its travel by reason of the rotation of said shaft 101 will engage with and rock the bell crank lever 112, which is pivoted at 113 upon the machine frame. The other end of said bell crank lever 112 is pivotally connected by a link 114 with one arm of a bell crank lever 115, which latter lever is pivoted on the machine frame at 116. Carried upon the other arm of said bell crank lever 115 is a pivoted releasing finger 117, pivoted at 118 and yieldingly held against a suitable stop by a spring 119. Said bell crank lever is acted upon by the restoring spring 120. Fixed upon the frictionally driven shaft 121 of the controller strip feeding cylinder 7 is an escapement wheel 122. Pivoted upon the machine frame in operative relation with said escapement wheel 122 is an anchor escapement 123. In the tail 124 of said anchor escapement is mounted a spring pressed slidable detent 125, which is normally against the side of a stop 126 carried upon the machine frame.

Whenever the arm 111 in its rotation engages with the bell crank lever 112, through the connections just described, it rocks the bell crank lever 115 against its spring 120, and the releasing finger 117 pushes the detent latch 125 out of engagement with its stop 126. This leaves the anchor escapement 123 free to swing and gives the controller strip feeding cylinder 7 a movement equal to a one tooth feed of the escapement wheel 122. The engagement of the passing tooth of the escapement wheel with the other arm of the anchor escapement swings the tail backwardly, and the detent latch 125 again engages its stop, thus insuring but a single tooth feed. By reason of the pivot and spring mounting of the releasing finger 117, it will be understood that the detent latch will engage its stop whether or not the releasing finger has had time to move back out of its path, as the latch in its angular movement, should it meet with said releasing finger, will give it a pivotal movement against its spring, the latch itself engaging with its stop. It will thus be seen that the controller strip receives a line feed each time that the characters of the composition pass through the sequence of the typographic machine, and that the perforations for all the characters occurring in sequence on the typographic machine will be placed upon one transverse line of the controller.

In typographic machines it is frequently desirable to print characters of different widths, and this is absolutely necessary where a high class product is desired, as otherwise such letters as m and w would have the same space in the line as i and l and the work in this respect would have the untidy and inartistic appearance so familiar in ordinary typewriting. Where the lines are to be justified, it is necessary to record or store the width values of the composed letters in each line in order to determine the surplusage or shortage of the completed line relatively to the predetermined line measure so as to distribute same among the interverbal or word spaces and thus justify the lines. For this purpose a unit value is assigned to each letter and word space, and as each letter or space in the composition is struck, the value thereof is stored away or recorded in the mechanism to be later recognized by the justifying mechanism in justifying the line.

In the embodied form (see Figs. 2 and 3) there is dependent from each key lever a pivotally hung rod 150. Slidably carried upon the lower end of each rod 150 is a contact head 151, a spring 152, coiled about the rod 150, acting between said contact head 151 and a shoulder at the head of said rod 150. In operative relation with each of said contact heads 151 is a unit gage interponent 153. Said interponent has a lug 154 thereon with which said contact head 151 engages to move the interponent into operative relation as hereinafter described. Said interponent has its tail 155 slidably and freely supported between two rods 156 and 157, said tail also passing through one of the slots of a guiding comb 158. Each interponent is provided near its head with a lug 159 to which is attached a spring 160 tending to impel the interponent upwardly and forwardly against a positioning rod 161. On the underside of said interponent is a notch 162. In operative relation with said series of interponents is a unit gage 170 provided with a blade or vane 171 having therein a series of notches, a notch being in register with the tail of each of said interponents, the depth of said notch being proportional to the unit width of the character represented by the interponent and its key lever. Where there are a plurality of cases or shifts upon the machine, as in the present embodiment, there is a blade or vane 171 for each shift or case, said blades or vanes being mounted upon a frictionally driven shaft 172 and each being rotatable into operative position with respect to said interponents when the corresponding shift or case is in use. Thus the difference in unit widths of upper and lower case and other changes are duly provided for.

Located below the series of interponents is a universal bail 173 carried on arms 174 fixed to the shaft 175 mounted upon the machine frame. Fixed to said shaft 175 is an arm 176. Pivotally connected between said arm 176 and a bell crank lever 178 is a link 177. Said bell crank lever 178 is loosely mounted upon a shaft 179. Fixed to said shaft 179 is a ratchet wheel 180, and a pawl 181 is pivotally connected to one arm of said lever 178 and engages with said ratchet wheel 180, said pawl being so held by the spring 182. A suitable locking pawl 183 also acts upon said ratchet wheel 180, to prevent back movement thereof. To the other end of said pawl carrying bell crank lever 178 is pivoted a link 184, the other end thereof being pivotally connected to bell crank lever 185. The other end of said last named bell crank lever is provided with a cam roll 186 in operative relation with a cam 187 upon the frictionally driven unit counting cam shaft 188. Said lever is held to its cam, and said mechanism just described is correspondingly held by the restoring spring 189 acting between the arm 176 and the machine frame.

Means are provided for actuating the unit counting mechanism in connection with each selection of a character. For this purpose there is provided in the present embodiment a cam 189 fixed on the punch actuating cam shaft 40 to rotate therewith. In operative relation with said cam is a lever 190, pivoted at 191, and held to its cam by the spring 192. On the other arm of said lever is provided a pivotally mounted releasing finger 193, pivoted at 194, and yieldingly held against a suitable stop 201 by the spring 195. Fixed on said unit counting cam shaft 188 is an escapement wheel 196. Coöperating therewith is an anchor escapement 197, pivoted at 198, and the tail piece 199 of said anchor escapement is provided with a spring pressed sliding latch 200, which is normally in position against a face of the fixed stop 201 to prevent rotation of said shaft.

The manner of operation of the mechanism just described is substantially as follows: When the punch operating shaft 40 rotates, the lever 190 is rocked to actuate the escapement wheel 196, and the unit counting cam shaft 188 is permitted to make a half rotation. By means of the cam 187, the bell crank lever 185 is rocked, it in turn rocking the pawl carrying lever 178 to carry the pawl 181 back along the teeth of ratchet wheel 180. Previous to this, however, the depression of the key lever has brought the corresponding interponent 153 downwardly so that its notch 162 engages the universal bail 173. As the bail 173 swings to the right, referred to Fig. 2 or 3, the interponent slides with it between the rods 156 and 157 and against the action of its spring 160. The distance that the interponent travels is controlled by the depth of the notch in the vane 171 of the unit gage which is in alinement with said interponent, and the rocking of the universal bar 173 which determines the amount of movement and storing of units, is similarly limited or controlled. This likewise limits the backward travel of the pawl 181, and thus determines the corresponding forward feed of the ratchet wheel 180 upon the return movement of the mechanism, which is in proportion to the unit value of the corresponding character on the typographic machine. The manner in which said units are stored from the shaft 179 (see Figs. 2 and 6), which is rotated by the ratchet wheel 180, will be hereinafter described.

Means are provided for shifting the unit gage blades or vanes to provide for variations in the width of the various characters, or the different cases of a particular character, produced on the typographic machine from a given perforation when different shifts are used in connection therewith. That is, in more detail, and merely by way of example, a single perforation in the controller strip may stand in conjunction with one shift perforation for a lower case roman character, and in connection with another shifting perforation said character selecting perforation may stand for the upper case roman of the same character, with a consequently different unit value, and so on with the other characters which may be indicated by such single character selecting perforations in connection with the various shift controlling perforations. In the present embodiment, a controller is prepared adapted to coöperate with a typographic machine having six shifts or different positions or characters corresponding to each character selecting perforation recognized by the typographic machine (see Figs. 1, 3, 5 and 15). As embodied the unit gage 170 consists therefore of six unit width determining vanes or blades 171 arranged radially or angularly about the frictionally driven shaft 172. The rotatory movement of said shaft 172 is controlled by mechanism governed by the various shift keys to bring the proper unit width determining vane or blade into operative relation with the interponents to correspond with the shift then in use. The embodied form thereof comprises six keys and key levers 220 corresponding to the six shift positions on the typographic machine, and each of said levers operates its perforating punch substantially in the manner already described. Connections are provided from these shift perforating key levers for rotating the unit width gage for the purpose already described. The embodied form of said means comprises a series of dependent pins 221, one of said pins being dependent from one of said shift perforating key levers and another from another. Arranged beneath said dependent pins are a corresponding series of arms 222 mounted on a rod 223, one of said arms being beneath one of said dependent pins, so as to be rocked thereby, and another of said arms being beneath another of said pins, and so on. Mounted on said rod 223 adjacent to each of said arms 222, is a corresponding arm 224 also pivotally mounted upon said rod 223. Each of said arms 224 is designed to actuate a stop for controlling a position of the unit gage, and said arms may be designated as stop positioning arms. Each stop positioning arm 224 is connected to the corresponding key lever actuated arm 222 by a spring 225, so that they move yieldingly together. Adjacent to the free end of said stop positioning arms are a series of stop pins designated respectively by the reference numeral 226. Said pins are positioned in a circle in the block 227 to slide therein. On the opposite face of said pin carrying block 227 from said positioning arm 224 is an arm 228 fixed upon the shaft 172 of the unit gage 170, said arm 228 adapted to travel or rotate over the face of said block. The various positioning pins 226 are projected into the path of this arm by the hereinbefore described connections from the various shift perforating levers, and the frictionally driven shaft 172 impels the arm 228 to rotation until stopped by a projecting pin 226. The pin projected, it will be clearly seen, corresponds to the shift perforating lever last actuated, and through the rotation of the arm 228 until stopped by the particular pin 226 projected by the actuation of the shift perforating lever, determines the particular blade or vane which shall be in operative relation with the interponents 153, and thereby determines a number of units which shall be recorded or stored against each character selecting or other unit consuming perforation made in connection with said shift position.

Means are provided for restoring a pin 226, that is to push it back into the block 227 in order that the arm 228 may advance to the next pin 226 projected by a shift perforating lever 220 which is actuated next in turn. Mounted upon said unit gage shaft 172 is an arm 230 provided at its end with a restoring finger 231. Said arm 230 is sleeved and splined upon said gage shaft 172, so that it rotates with the shaft and in definite position with respect to the stop arm 228 but is slidable longitudinally on the shaft 172. For this purpose the sleeve 232, carrying said arm 230 is provided with a groove 233. In this groove rests a pin 234 carried on an arm 235 of a bell crank pivoted at 236 upon the machine frame. The end of the other arm 237 of said bell crank lever is embraced by the forked end 238 of one arm of a bell crank lever pivoted at 239 upon the machine frame. The other arm 240 of said bell crank lever is pivoted to a link 241, which link is likewise pivoted to an arm 242, which arm is pivoted at 243 upon the machine frame. Said arm 242 is provided with a roller 244 in position to be engaged by a pin 245 upon the friction disk 246 carried upon the unit counting cam shaft 188.

Beneath the six shift perforating levers 220 extends a rod 260 carried on one arm 261 of a bell crank lever pivoted at 262 upon the machine frame. At the end of the other arm 263 of said bell crank lever is carried a pivoted spring pressed pawl 264. In operative relation with said pawl is a latch lever 265 pivoted at 266 upon the machine frame, and acted on by restoring spring 268. The other end of said lever is provided with a detent hook 267 which engages with a pin 269 on the bell crank lever 238—240 heretofore described. Projecting from said latch lever is an arm 270 adapted to coöperate with its universal bar or bail 173 heretofore described in a manner which will be set forth hereinafter. A suitable restoring spring 271 for said mechanism is provided.

The manner of operation of said restoring mechanism is substantially as follows: The unit counting cam shaft 188 operates each time that a unit consuming perforation is made, but the pivoted arm 242 is held from movement by reason of the bell crank lever 238—240 being latched as already described. Whenever a new shift perforating lever 220 is actuated, however, the bell crank lever 238—240 is actuated by reason of said lever engaging the rod 260. The latching lever 265 is swung to release the bell crank lever 238—240, and the rocking arm 242 is actuated by the pin 245. This rocks the bell crank lever 235—237, and the restoring finger 231 upon the arm 230 pushes in the pin 226 against which the arm 228, fixed on the unit gage shaft 172 is positioned. The actuation of the shift perforating lever 220 hereinbefore mentioned, however, has already projected another pin 226 out of the face of the pin block 227 in the manner already described. Thus by the pushing in of one of said pins 226 and the projecting of another of said pins 226, the arm 228 is allowed to travel the angular distance between the two pins and the unit width determining vane or blade 171 corresponding to the last shift perforating lever operated is brought into operative relation with the series of interponents 153. The rocking of the universal bail or bar 173 during the actuation of a shift lever is prevented by the arm 270 so that no units are stored from the actuation of said shift levers. In the present embodiment, the counted or stored units are represented in the mechanism by the amount of movement or travel of a rack or bar 300 toward a positioned line measure stop 301, the relative position of the end of the bar and of said stop representing the shortage of the length of the composed line from the line measure, and the amount of increase which must be provided or apportioned among the interverbal spaces to justify the line of characters in the typographic machine. The relative position and movement of said bar and stop also perform the same service for an overset line and determine the amount of minusing or decrease in the word spaces necessary to justify the line. Connections are provided to the justifying mechanism whereby the condition of each composed line is connected to the justifying mechanism, governing the setting of said mechanism and its marking of justifying values on the controller.

In the embodied form, the ratchet wheel 180 is fixed on the shaft 179 so that they rotate together. There are suitable connections which will be described later in more detail between said ratchet wheel 180 and its shaft 179 and the unit counting bar 300, whereby as the ratchet wheel is rotated proportionately to the unit values of the successively operated punches, said bar will be advanced proportionately toward the line measure stop 301. Said unit storing bar 300 has a toothed rack thereon with which meshes a gear 302 fixed on a shaft 303 to rotate therewith. Connections are also provided whereby as the unit storing bar is advanced, it places under tension a suitable spring by which said bar is restored to its initial position for beginning a new line at the proper time. In the embodiment of such mechanism; a gear 304 meshes with said unit bar progressing gear 302. Said gear is fixed upon the shaft 305 to which is connected the spring and casing 306, which may act in the ordinary manner of the familiar clock spring. Fixed upon said shaft 305 to rotate therewith is a ratchet wheel 307, which acts in connection with the line justifying mechanism in a manner which will be hereinafter explained. It will be seen, therefore, that as the unit storing bar 300 is progressed; it will wind up the spring 306, and at a later time when the mechanism is released, the spring will act to slide back the bar in the opposite direction.

As has heretofore been described, the act of perforating the paper is delayed one stroke after the depression of the key lever which determines the selection of the perforation and sets the interponent therefor. This gives opportunity before the next subsequent key is struck for correcting any errors due to striking the wrong key, and provision is likewise made in the mechanism for eliminating the units recorded or stored against such erroneously selected character. In the present embodiment this mechanism acts between the ratchet wheel 180 upon which the units are first run up and the unit storing bar 300 whereby said bar may be moved back a number of units corresponding to the character erroneously selected but for which no perforation is to be made. In the embodied form of such means a toothed wheel 310 is fixed upon the shaft 303 to rotate therewith, which is the shaft upon which the gear 302, which engages and progresses the unit storing bar 300, is also fixed. Mounted upon the shaft 179, to rotate therewith while slidable therealong, is a sleeve 311 provided with an annular groove 312. For this purpose a collar 313 is fixed to the shaft 179 to rotate therewith and is located contiguously to said sleeve 311. A pin 314 is fixed to said sleeve 311 and slides in an aperture in said collar 313, whereby the sleeve may slide longitudinally on the shaft but is made to rotate therewith. In the groove 312 of sleeve 311 is located a pin 315 carried upon the arm 316 fixed to the rock shaft 317. Fixed to said sleeve 311 is an arm 318 having a tooth 319 adapted to engage with the teeth 320 upon the wheel 310, as shown in Figs. 6 and 12. Loosely carried upon the other shaft 303 is a sleeve 330 to which is fixed an arm 331 which arm likewise has a tooth 332 adapted to engage with the teeth 320 of said wheel 310. This sleeve and arm is both slidable and rotatable or angularly movable with respect to its shaft 303. Said sleeve 330 is provided with an annular groove 333 in which works a pin 334, carried by an arm 335 fixed to a shaft 336. Mounted upon the support for said shaft is a bracket 337 provided with ears 338 and 339 which project either side of said arm 331 so that its angular movement is limited thereby. In each of said ears there is also shown adjusting screws 340 and 341, whereby the angular movement of said arm may be accurately regulated to permit movement of the unit storing bar precisely equal to a unit, or some multiple thereof in the line measure.

Further in the embodied mechanism, a suitable key and key lever 342 are provided which may be conveniently called a "correcting key." Said key lever is provided with a cam piece 343 at its end, which is adapted to engage with the pin 334, which pin not only works in the groove 333 of its collar 330, as previously described, but projects outwardly in the opposite direction to coöperate with said cam 343. Connections are provided whereby the toothed arms 318 and 331 are caused to alternately engage the wheel 310. For this purpose an arm 344 is fixed to the shaft 317 and a corresponding arm 345 is fixed to the shaft 336, and they are connected one to the other by means of a pivoted tie-rod 346. A spring 347 tends normally to hold the toothed arm 318 in engagement with the wheel 310, as shown in Fig. 12. It will be understood that when these connections between the two shafts 317 and 336 are in the position shown in said Fig. 12 the shafts 179 and 303 rotate together and every movement of the ratchet wheel 180 to record the units corresponding to the key levers actuated, will be communicated to the unit storing bar 300. Supposing the case of an error in striking a key lever, the necessary change in the interponents is made, substituting the correct one for the incorrect one previously positioned, which may be manually effected. The correction key 342 is then depressed, and the cam piece 343 moves the toothed arm 331 to the left referred to Figs. 6 and 12 and the connections already described, will move the toothed arm 318 out of said toothed wheel 310. The toothed arm 331 may then move the distance permitted by the adjusting screws 340 and 341 and the unit storing bar is retrogressed an equivalent amount, which is usually most conveniently one unit of the line measure. As soon as the correction key is released by the finger of the operator, the toothed arm 331 slides out of the wheel 310, and the other toothed arm 318 slides into the wheel 310 due to the pull of the spring 347. Thus the unit storing bar is again connected up to the unit counting devices. It will be understood that repeated actuation of the correcting key will eliminate any desired number of units. A suitable spring (not shown) is provided for angularly restoring the arm 331 after passing out of engagement with the toothed wheel 310 preparatory to the next feeding movement thereof in connection with the correcting key.

Suitable mechanism is provided whereby after a line has been composed, the shortage or surplusage of a composed line with respect to the line measure may be mechanically ascertained and communicated to the justifying mechanism whereby the proper marks or perforations may be made in the controller to cause the typographic machine to so regulate the interverbal spaces as to justify the line. In the embodied form of such means, devices are provided for moving the unit storing bar 300 to the limit of the line measure and at the same time giving a corresponding movement to a member coöperating with the justifying mechanism. This is done, however, without any computation or noting of values on the part of the operator; in other words, the justifying result is attained by the machine itself. As embodied, a hand lever 400, which may for convenience be called the "justifying lever," is mounted upon a shaft 401. Said lever has pivotally mounted thereon a pawl 402, normally pressed by a spring 403 into engagement with ratchet wheel 307. On a suitable bracket 404 on the machine frame is carried an adjusting screw 405 which engages with the tail of said pawl 402 to lift it out of engagement with said ratchet wheel 307, thus providing an adjustment for varying or regulating point of engagement of the pawl with the teeth of ratchet wheel 307 and thus determining the amount of rotation of the ratchet wheel for any given amount of travel of said lever 400. It will be recalled that said ratchet wheel 307 is fixed on the shaft 305 and that its rotation therefore correspondingly advances the unit storing bar 300 in the direction of filling the line. Fixed to the justifying lever 400 is a segmental rack 406 with which engages a toothed bar 407 which communicates with or may be regarded as part of the justifying mechanism, and which mechanically communicates to the justifying mechanism the condition of the line to be justified so that the controller may be marked accordingly.

Means are provided whereby during the manipulation of the justifying lever 400, and the subsequent restoring of the unit storing bar 300, said mechanisms may be cut off from the unit counting devices. As embodied there is fixed to the shaft 401 of the justifying lever an arm 410 adapted to engage an arm 411 connecting by a pivoted link 412 to an arm 413 on shaft 317 which rocks to throw out toothed arm 318. Thus when the justifying lever 400 is thrown forward, said arm 410 through the connections described, moves the toothed arm 318 out of engagement with the wheel 310. The connections between the depending arm 344 of the rock shaft 317 and the tie rod 346 is slotted, as shown in Figs. 6 and 12, whereby there is no corresponding movement at this time of the other toothed arm 331 into the wheel 310. The unit storing bar 300 is thus disconnected from the unit counting devices and is left free to move in correspondence to the movements of the justifying lever 400 by the hand of the operator, and to be restored later by spring 306. Means are also provided for holding the toothed arm 319 out of connection with the wheel 310 until the beginning of the new line of composition by the machine. For this purpose a bell crank lever 420 is pivoted at 421 upon the machine frame. Said lever has a detent 422 upon one arm thereof adapted to coöperate with a pin 423 upon said depending arm 344. A suitable spring 424 acts upon the other arm of said lever 420 to press the detent into engagement with the pin. Said arm of said lever has a pin and slot connection 425 with a rod 426, which rod is actuated by a key lever at the key board to lift said detent from the pin in order to allow the toothed arm 318 to pass into engagement with said toothed wheel 310 preliminary to beginning the counting of another line. This key is called for convenience the "line start" key. By reason of the pin and slot connection between said arm 344 and the tie-rod 346 the toothed arm 318 when moved by the train of mechanism just described passes out of engagement with the toothed wheel 310 without moving the toothed arm 331 into engagement with the wheel, and at the same time allows the pin 423 in said arm to pass beneath and to be held by the detent 422 to hold the toothed arm 318 out of engagement with the wheel 310 against the action of its restoring spring 347.

When the mechanism is actuated by the correction key, as hereinbefore described, the bent end 427 of the tie-rod 346 passes underneath the detent hook 422 and holds it out of engagement with its pin, so that in that case one toothed arm is always in engagement with the toothed wheel.

The line measure stop 301 which coöperates with the line storing bar 300 and represents the limit of the justified line in terms of the travel of said bar, as embodied, comprises an arm 450 fixed on a shaft 451. In said arm is mounted an adjusting screw 452 provided with a suitable locking nut to give accurate adjustment. Fixed also to said shaft is an arm 453 carrying a pin 454. Coöperating with said pin is a pivoted latching lever 455 which, when in engaging position with the pin, prevents said arm, and consequently the line stop, from moving to the right, referred to Fig. 4. Said latching lever is pivoted at 456 upon the machine frame. Between its latching hook and said pivot, it is provided with a pivoted joint 457, one part of the lever, or arm, being spring held against the stop 458 on the other part of the lever, whereby the parts of said arm may move against the pressure of said spring (not shown) when desired. The tail of said latching lever 455 is provided with a cam surface 459 with which coöperates a cam roll 460 on the justifying lever 400. A suitable spring 461 holds the line stop 301 yieldingly to position.

Means are provided for preventing the restoration or retrograde movement of the line storing bar 300 after it has been released from the unit counting mechanism and is operated by the justifying lever 400 prior to the completion of the transfer of the line values to the justifying mechanism. As embodied, said means comprises a locking pawl 462, pivoted on the machine frame and spring pressed into engagement with the ratchet wheel 307 by a suitable spring (not shown). On the tail of said pawl is provided a pin 463 with which coöperates a detent latch lever 464 fixed on the shaft 465. Fixed also on said shaft is an arm 466 from which extends upwardly a rod 467 which terminates beneath the tail of the previously described latching lever 455. A suitable restoring spring (not shown) is provided.

Adjacent to the tail of the locking lever is a longitudinally movable rod 468 having a collar 469 thereon adapted to engage and move a locking lever 462 out of engagement with its ratchet wheel 307 when said rod is moved longitudinally. To one end of said rod 468 is pivoted a bell crank lever 470, said bell crank lever being pivoted at 471 upon the machine frame. A rod 473 is pivotally connected to the other end of said bell crank lever and to one end of a bell crank lever 474, pivoted at 475. A pivoted rod 476 is connected to the other end of said bell crank lever, and to a key lever 477 which may be conveniently called the "line closing key." The other end of the rod 468 is pivoted to a lever arm 478 which has connections whereby certain functions or controls of the justifying mechanism are effected as hereinafter described.

Fixed upon the shaft 451 of the line stop device, is an arm 480 connected by a pivoted rod 481 to a lever 482 pivotally mounted upon the machine frame. Said lever at its upper end has a pin and slot connection 483 with a rod 484 upon which is mounted a plate 485. Said sliding rod and plate are connected to the justifying mechanism in a manner hereinafter to be described in order to register in said mechanism any surplusage or oversetting of the line, in order that the justifier may mechanically recognize the extent thereof, and thus determine the minusing or decrease necessary in the word spaces to justify the line.

The manner of operation of the mechanism just described is substantially as follows: Considering first the case where the composed line falls short of the line measure, and there is to be recorded or recognized in the justifier a shortage, whereby each interverbal space must be increased to justify the line. In that case, the unit storing bar 300 will have been advanced by the actuation of unit counting key levers to a position where its forward end will still be short of the line stop 301 (referring especially to Fig. 4). It will be understood that the operator has been given a signal by the machine whereby he may complete the longest syllable upon which he may be engaged after the giving of the signal and still be within the justification limits of the machine. On completing the composition of the line, the operator actuates the justifying lever 400 pushing it forward, or to the right, referred to Fig. 4. This will disengage the unit storing bar 300 from the unit counting mechanism as hereinbefore described, and by means of the pawl 402 and ratchet 307 the unit storing bar will be advanced toward the line stop 301. At the same time the actuation of the justifying lever, through the action of its cam roll 460 on the cam face 459 on the latching lever 455 will cause said lever to engage the pin 454 and hold the line stop firmly in position. Also the rocking of the latch lever 455 will move the rod 467 downwardly and will rock the detent 464 clear of the locking lever 462, which will engage the ratchet wheel 307, thus holding the unit storing bar 300 from rectrograde movement by its spring 306. The justifying lever 400 may be actuated repeatedly if necessary to advance the unit storing bar, until said bar engages with the line measure stop 301. By reason of the engagement of the justifying rack 407 with the toothed segment 406, said rack will move to and fro with the justifying lever, and the effect of said movement will be described fully in connection with said justifying mechanism. After said unit storing bar 300 has reached the limit of its travel and is in engagement with the line measure stop 301, the justifying mechanism is in condition to take all steps necessary for making the justifying perforations, and the line storing bar may be restored for the next succeeding line. The line closing key lever 477 is struck, and sets the justifying mechanism in operation, as hereinafter described, and the collar 469, on the rod 468, engaging the tail of the latch lever 462 moves it to the left (referred to Fig. 4) whereby it is locked out of the ratchet wheel by its latching lever 464, which latch lever yields against its spring to permit the locking lever to pass into engaging position with said latch lever. The spring 306 is now free to slide the unit storing bar 300 back to its initial position.

Considering the case where the line is overset, or there is a surplusage in the composed line, and the line is justified by diminishing the word or interverbal spaces, it will be seen that the unit storing bar 300 reaches the line measure stop 301 before the completion of the composition of the line. Thus the unit storing bar 300 in its further advance rocks the line measure stop 301 upon its shaft (to the right referring to Fig. 4) until the line is completed. At the same time, however, through the arm 480 and the pivoted link 481, lever 482 is also rocked, and the sliding plate 485 is advanced in the justifying mechanism, which mechanism is thus apprised that a minusing or decrease of the interverbal spaces is required to justify the line. In such case the operator will move the justifying lever 400, with its justifying rack 406, a short distance in order to effect a certain function in the justifying mechanism, but which movement need not be sufficient to bring the pawl 402 into engagement with the ratchet wheel 307, and thus no further forward movement of the line storing bar 300 is necessary. During this movement the lever 455 moves upwardly as heretofore described, but the stop arm 301 is too far to the right, referred to Fig. 4, to be latched thereby. Said latch lever 455, therefore, moves about its pivot 459 so that while the end is stopped by contacting with pin 454, but not in position to latch it, the tail of said lever 455 is moved by the roll 460 as already described. The line closing key may then be struck in the manner and with the effect heretofore described.

In the embodied form of the invention, the controller is in two parts or strips, one carrying the justifying marks or perforations and the other marks or perforations being in the other strip and which are made by the mechanisms previously described. The strip of paper or other material for receiving the justification perforations passes between and is engaged by sprocket rollers 499 and 500. On the shaft 501 of said roller 500 is an escapement wheel 502, with which coöperates an anchor escapement 503. The tail 504 of said anchor escapement is provided with a sliding, spring pressed latch 505, which rests against the fixed stop 506 to hold the escapement at rest. In operative relation with said latch is a releasing finger 507 pivotally mounted on one arm of bell crank lever 508, which lever is pivoted at 509 upon the machine frame. To the other end of said bell crank lever 508 is pivotally connected a rod 510. Said rod is also pivotally connected to a bell crank 511, pivoted upon the machine frame at 512 (see Fig. 4). To the other end of said bell crank lever 511 is pivoted a rod 513 which rod is also pivoted to a word space bar 514 at the keyboard of the machine. The shaft 501 is frictionally driven by the friction clutch 115. Thus at each actuation of said word space bar 514 the anchor escapement 503 permits a feed of one tooth of the escapement wheel 502 in a manner which will be readily understood. The controller strip passes also between the sprocket rollers 516 and 517, and between said two sets of rollers it is operated upon by the perforating mechanism for the justifying perforations.

The perforating means as embodied comprises a plurality of slides 520, each being recessed or forked at its end, and carrying a punch 521 in one fork thereof and a corresponding die 522 in the other fork. Into the recess or opening 523 between said forks the controller strip passes and is perforated when the punches are actuated. Each of said slides is impelled in one direction by suitable spring means, and as embodied the end of each of said slides is engaged by a pivoted arm 524 acted on by a spring 525. Each slide is, however, held in position against the action of said spring by a slidable, spring pressed detent 526, which is pressed by its spring 528 into engagement with one of a series of teeth 527 on said bar.

The controller marking mechanism, as embodied, comprises the justifying punch slides 520, which are positioned to make the justifying perforations by mechanism which will be later described. The embodied mechanism for operating the punches comprises a ram 540 slidably mounted in the machine frame. Said ram is operated by toggles 541. To one of said toggles is pivotally connected a link 542, said link also being connected to a lever 543, provided with a cam roll 544 coöperating with a cam 545 upon cam shaft 546. Said cam shaft 546 is connected by miter gears 547 to driving shaft 548, driven from pulley 549. Said shaft 546, is, however, loose from gear 547 and is connected thereto and disconnected therefrom by a suitable clutch mechanism. Said clutch mechanism comprises a collar 550 rotatable with the shaft 546 but slidable longitudinally therealong. Said slidable collar 550 has thereon one or more teeth 552 which engage with suitable depressions in the face of the sleeve 551 which rotates with the gear 547. In the surface of said block 550 is formed a helical groove 553. Into said groove projects a rod 554 working in a suitable guide in the machine frame and pivotally connected to the bell crank lever 478, which through its pivoted link 468 connects to the line closing key 477.

In the embodied form of means for controlling the position of the punch carrying slides 520, means are provided for bringing into coöperative relationship with the unit storing mechanism as many punch carrying slides 520 as there are word spaces in the line to be justified. For this purpose a pinion 560 on shaft 501 engages with a word space rack 561, which rack receives from said pinion 560 for each word space escapement of said shaft 501 a travel equal to the width of one of the punch carrying slides 520. Said word space rack 561 is provided with a stop 562 which projects into the path of the justifying rack 407 which slides alongside the word space rack 561. The nose 563 of said justifying rack is adapted to engage with lugs 564 upon the slidable spring pressed detents 526 (see Figs. 9 and 18). Upon said slides 526, respectively, are also lugs 565, located just above the path of travel of the plate 485, which is moved through lever 482, by the line measure stop 301. Mounted in a plate 566 on the machine frame, is a movable pin 567 which lies in the path of the justifying rack 407 (see Fig. 7). This mechanism is used to effect the minus justifying for an overset line.

Suitable restoring devices for the various mechanisms are provided. Meshing with the word space rack 561 is a gear 570 connected with which is a restoring spring of suitable form. Beneath the justifying punch carrying slides 520 is a bail 571 carried on arms 572 fixed to a shaft 573. Fixed to said shaft 573 is an arm 574 having a cam roll 575 coöperating with a cam 576 fixed to rotate with the shaft 546. Fixed to said shaft 573 is an arm 577 provided with a suitable roll 578. Said roll 578 coöperates with a lever 579 pivoted at 580 upon the machine frame. The end 581 of said lever 579 is in operative relation with the spring pressed slidable detent 505 of the escapement 503. Said lever 574 also terminates in a finger piece 582. Said lever is provided with a pin 583, engaging in an annular groove 584 in a collar 585 formed in a sleeve 586, which sleeve is rotatable with but slidable along shaft 501. Said gear 560 is fast on said sleeve 586, and is movable to and from the plate 587, fixed on the shaft 501. A spring 588 acts between said collar 585 and a collar 589 fixed on said shaft 501.

The manner of operation of the hereinbefore described mechanism is substantially as follows: When the escapement 503 is actuated, the controller strip is fed forward as previously described the distance permitted by one tooth of the escapement wheel 502, which is also the distance between two successive punch slides 520. At the same time, the word space rack 561 is fed forward by its gear 560 the width of a punch carrying slide 520. This is repeated for each successive word space, and the controller strip is thus fed forward a sufficient distance to receive the perforations of the greatest number of punches which will possibly be actuated in the justifying of the particular line. Also the word space rack will have moved forward past a number of the punch carrying slides 520 equal to the word spaces in said line. The stop on said word space rack 561, it will be recalled, is in the path of travel of the justifying rack 407, and will thus limit the travel of the justifying rack during the settling of the punch slides 520 to a number of slides equal to the word spaces in the line. It will also be recalled that the total forward travel of the justifying rack 407 is proportionate to the distance between the unit storing bar 300 and the line measure stop 301, which distance represents the shortage of the composed line from the line measure, and which shortage is to be distributed between the various word spaces of the line. When the justifying lever 400 is pushed to the right (referred to Fig. 4), as previously described, the unit storing bar 300 travels toward the line stop 301. At the same time the justifying rack 407 travels forward, and its nose engaging successively with the lugs 564 releases the corresponding slides 520 the distance of one rack tooth 527 to the left (referred to Fig. 9). Should the number of units to be distributed into the interverbal or word spaces be less than the number of word spaces, the rack 407 will be arrested by the bar 300 striking the line measure stop 301, and the requisite number of slides 520 will have been escaped the distance of one ratchet tooth 527 to the left (referred to Fig. 9) and be in operative position beneath the ram 540. Should the number of units to be distributed exceed the number of word spaces in the line, the justifying rack 407 will be arrested in its movement by the stop on the word space rack 561, in order to confine the operation of the justifying rack to the number of spaces in the line. This will occur until the number of units to be distributed is exhausted, which takes place when the bar 300 reaches the line measure stop 301. It will be understood that on the second forward movement of the justifying rack 407, that is, on its second reciprocation it will operate the detents 526 to let a second rack tooth 527 escape, and thus advance the corresponding slide 520 one position farther to the left (referred to Fig. 9). The bar 300 reaching the line measure stop 301 closes the operation. Striking the line close key releases the unit storing bar 300 to be restored to its original position for the next succeeding line as already described. It also calls shaft 546 into action, through the actuation of bell crank lever 478 and clutch 550. This operates the ram 540 to make the justifying perforations. The continued rotation of the shaft 546 rocks lever 574, which feeds forward the perforated portion of the controller, and disengages the word space rack 561 from its pinion 560 whereby the rack is restored to initial position by the gear 570 and its coöperating spring. The justifying rack, it will be recalled, reciprocates with the lever 400 and is positioned thereby. The rocking of shaft 573 also swings the bail 571 from the dotted line position to the full line position, referred to Fig. 9, and thus restores the slides 520 to initial position.

Considering the case of minus justification, the functions generally will be as hereinbefore described, except as to the setting of the slides and the functions and operations dependent thereon. Where the justification is to be effected by minusing, it will be recalled that the unit storing bar 300 has rocked the line measure stop to the right (referred to Fig. 4). This has caused the plate 485 to advance past a number of slides 520 equal to the number of units of surplusage or oversetting in the composed line. In the typographic machine with which the present embodiment is designed to prepare a controller for, the farthest position to the left of the punches 521, and the resulting perforations in the controller, represents the minus justifying, whereby each word space is reduced one unit. When the plate 485 is positioned as described, beneath one or more of the slides 520, the advancing of the justifying rack 407, at the early part of its movement, raises the slidable pin 567 and rocks the plate 587, whereby it engages the lugs 565 and releases every one of the slides with which the plate 485 is in operative relation to its utmost or farthest to the left position. The perforations are then made by the ram 540 in the usual manner.

It is believed that the manner of operation of the entire machine has been fully set out in connection with the various groups of mechanism, or will be clear herefrom to those skilled in the art.

It will be understood that the invention in many of its aspects is equally adaptable to making a one part controller and is not limited to making a two part controller.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A machine for producing controllers for typographic machines including in combination means for feeding the controller independently of the actuation of the punches, a key lever, a punch, a punch actuating device and an interponent movable by the key lever into position to cause the punch actuating device to actuate the punch.

2. A machine for producing controllers for typographic machines including in combination means for feeding the controller independently of the actuation of the punches, a key lever, a punch, a punch actuating device and an interponent movable into position between the head of the punch and the punch actuating device to communicate the movement of the actuating device to the punch.

3. A machine for producing controllers for typographic machines including in combination means for feeding the controller independently of the actuation of the punches, a key lever, a spring restored punch, a punch actuating device and an interponent movable into position between the head of the punch and the punch actuating device to communicate the movement of the actuating device to the punch, said interponent being adapted to move sidewise off the head of the punch to permit the punch to return under the impulsion of its spring independently of the further movement of said interponent.

4. A machine for producing controllers for typographic machines including in combination a key lever, a spring restored punch, a punch actuating device and an interponent movable into position between the head of the punch and the punch actuating device to communicate the movement of the actuating device to the punch, and a spring pressed contact member mounted on said interponent for contacting with the head of said punch and being adapted to slide from the head of the punch after it has been actuated to permit the punch to return independently of the movement of said interponent.

5. A machine for producing controllers for typographic machines including in combination a die, a punch coöperating therewith to perforate the controller, spring restoring means for said punch, a pivoted member movable to cause the punch to perforate the controller and pivoted spring pressed contact piece mounted on said member and snapping into operative position behind said punch during the movement of said member in one direction and also permitting the punch to slip past and be restored after the controller has been perforated independently of the further movement of said member.

6. A machine for producing controllers for typographic machines including in combination a die, a punch coöperating therewith to perforate the controller, spring restoring means for said punch, a pivoted member movable to and fro about its center to actuate said punch, a spring pressed contact piece pivotally mounted on said member and yieldingly movable into operative position with the head of the punch when said member moves in one direction into position to actuate the punch, and adapted to slide off the head of said punch as said member moves in the opposite direction to actuate the punch, to permit the restoration of the punch independently of said member.

7. A machine for producing controllers for typographic machines including in combination a key lever, a punch, actuating devices for said punch including a member movable into operative position relatively to the punch by said key lever and a yielding contact member between said key lever and said movable member, said contact and member moved thereby being unconnected.

8. A machine for producing controllers for typographic machines including in combination a key lever, a punch, actuating devices for said punch including a member movable into operative position relatively to the punch by said key lever and a pivoted and spring pressed contact member between said key lever and said movable member, said contact and member moved thereby being unconnected.

9. A machine for producing controllers for typographic machines including in combination a key lever, a punch, actuating devices for said punch including a member movable into operative position relatively to the punch by said key lever, and a pivoted, spring pressed contact mounted upon said key lever and adapted to engage said movable member to position it relatively to said punch.

10. A machine for producing controllers for typographic machines including in combination a key lever, a punch, a traveling punch actuator, and an interponent engaged directly by the key lever to be moved into position to cause said punch actuator to actuate the punch.

11. A machine for producing controllers for typographic machines including in combination a key lever, a punch, a traveling punch actuator, and an interponent engaged directly by the key lever to be moved into position to be directly engaged by said punch actuator to actuate the punch.

12. A machine for producing controllers for typographic machines including in combination a key lever, a punch, a traveling punch actuator, and an interponent engaged directly by but unconnected to the key lever to be moved into position to cause said punch actuator to actuate the punch.

13. A machine for producing controllers for typographic machines including in combination a key lever, a spring restored punch, a pivotally mounted, reciprocating punch actuating device and an interponent movable into position between the head of the punch and the punch actuating device to communicate the movement of the actuating device to the punch, said interponent being adapted to move sidewise off the head of the punch to permit the punch to return under the impulse of its spring independently of the further movement of said interponent.

14. A machine for producing controllers for typographic machines including in combination a key lever, a spring restored punch, a punch actuating device and a pivotally mounted, reciprocating interponent movable into position between the head of the punch and the punch actuating device to communicate the movement of the actuating device to the punch, said interponent being adapted to move sidewise off the head of the punch to permit the punch to return under the impulse of its spring independently of the further movement of said interponent.

15. A machine for producing controllers for typographic machines including in combination a key lever, a spring restored punch, a pivotally mounted, reciprocating punch actuating device, and a pivotally mounted, reciprocating interponent movable into position between the head of the punch and the punch actuating device to communicate the movement of the actuating device to the punch, said interponent being adapted to move sidewise off the head of the punch to permit the punch to return under the impulsion of its spring independently of the further movement of said interponent.

16. A machine for producing controllers for typographic machines including in combination a series of key levers, a series of punches, punch actuating means, a series of interponents corresponding to said series of punches and key levers, each interponent being settable only by its key lever into operative relation between its punch and said punch actuating means whereby the punch may be actuated by said actuating means to perforate the controller.

17. A machine for producing controllers for typographic machines including in combination a series of key levers, a series of punches one for each key lever, punch actuating means, a series of pivotally mounted interponents one for each punch and its key lever, each interponent being settable by its key lever into operative relation between its punch and said punch actuating means whereby said punch may be operated by said actuating means to perforate the controller.

18. A machine for producing controllers for typographic machines including in combination a series of key levers, a corresponding series of punches, punch actuating means, a series of interponents corresponding to said series of punches and key levers, each interponent being settable by its key lever into operative relation between its punch and punch actuating means, and means for controlling the punch actuating means whereby one interponent is caused to actuate its punch and another interponent is brought into operative relation with its punch and with said punch actuating device for each actuation of said device.

19. A machine for producing controllers for typographic machines including in combination a series of key levers, a corresponding series of punches, punch actuating means, a series of pivotally mounted, reciprocating interponents corresponding to said series of punches and key levers, each interponent being settable by its key lever into operative relation between its punch and punch actuating means, and means for controlling the punch actuating means whereby one interponent is caused to actuate its punch and another interponent is brought into operative relation with its punch and with said punch actuating device for each actuation of said device.

20. A machine for producing controllers for typographic machines including in combination a series of key levers, a corresponding series of punches, pivotally mounted punch actuating means, a series of pivotally mounted, reciprocating interponents corresponding to said series of punches and key levers, each interponent being settable by its key lever into operative relation between its punch and punch actuating means, and means for controlling the punch actuating means whereby one interponent is caused to actuate its punch and another interponent is brought into operative relation with its punch and with said punch actuating device for each actuation of said device.

21. A machine for producing controllers for typographic machines including in combination a series of key levers, a corresponding series of punches, pivotally mounted, reciprocating punch actuating means, a series of pivotally mounted, reciprocating interponents corresponding to said series of punches and key levers, each interponent being settable by its key lever into operative relation between its punch and punch actuating means, and means for controlling the punch actuating means whereby one interponent is caused to actuate its punch and another interponent is brought into operative relation with its punch and with said punch actuating device for each actuation of said device.

22. A machine for producing controllers for typographic machines including in combination a series of key levers, a corresponding series of punches, actuating means for said punches, a series of interponents corresponding to said series of punches and key levers, said interponents being movable into and out of operative position between their respective punches and said punch actuating means, and means carried upon each key lever for causing said punch actuating means to actuate a punch whose interponent has been previously set and for setting the interponent corresponding to said actuated lever in operative position between its punch and said punch actuating means.

23. A machine for producing controllers for typographic machines including in combination a series of key levers, a corresponding series of punches, actuating means for said punches, a series of pivotally mounted, reciprocable interponents corresponding to said series of punches and key levers, said interponents being movable into and out of operative position between their respective punches and said punch actuating means, and means carried upon each key lever for causing said punch actuating means to actuate a punch whose interponent has been previously set and for setting the interponent corresponding to said actuated lever in operative position between its punch and said punch actuating means.

24. A machine for producing controllers for typographic machines including in combination a series of key levers, a corresponding series of punches, pivotally mounted, reciprocable actuating means for said punches, a series of pivotally mounted, reciprocable interponents corresponding to said series of punches and key levers, said interponents being movable into and out of operative position between their respective punches and said punch actuating means, and means carried upon each key lever for causing said punch actuating means to actuate a punch whose interponent has been previously set and for setting the interponent corresponding to said actuated lever in operative position between its punch and said punch actuating means.

25. A machine for producing controllers for typographic machines including in combination a series of key levers, a corresponding series of punches, common actuating means for a plurality of said punches, a series of interponents corresponding to said series of punches and key levers, said interponents being movable into and out of operative position between their respective punches and said punch actuating means, and means carried upon each key lever for causing said punch actuating means to actuate a punch whose interponent has been previously set and for setting the interponent corresponding to said actuated lever in operative position between its punch and said punch actuating means.

26. A machine for producing controllers for typographic machines including in combination a series of key levers, a corresponding series of punches for perforating the controller, common movable actuating means for a plurality of said punches, a series of interponents corresponding to said series of punches and key levers, said interponents being movable into and out of operative position between their respective punches and said punch actuating means, and means upon each key lever for causing said punch actuating means to actuate a punch whose interponent has been previously set and for setting the interponent corresponding to said actuated lever in operative position between its punch and said punch actuating means as said punch actuating means returns from said actuating movement.

27. A machine for producing controllers for typographic machines including in combination a series of key levers, a corresponding series of punches for perforating the controller, common movable actuating means for a plurality of said punches, a series of pivotally mounted, reciprocable interponents corresponding to said series of punches and key levers, said interponents being movable into and out of operative position between their respective punches and said punch actuating means, and means upon each key lever for causing said punch actuating means to actuate a punch whose interponent has been previously set and for setting the interponent corresponding to said actuated lever in operative position between its punch and said punch actuating means as said punch actuating means returns from said actuating movement.

28. A machine for producing controllers for typographic machines including in combination a series of key levers, a corresponding series of punches for perforating the controller, common pivotally mounted, reciprocable actuating means for a plurality of said punches, a series of interponents corresponding to said series of punches and key levers, said interponents being movable into and out of operative position between their respective punches and said punch actuating means, and means upon each key lever for causing said punch actuating means to actuate a punch whose interponent has been previously set and for setting the interponent corresponding to said actuated lever in operative position between its punch and said punch actuating means as said punch actuating means returns from said actuating movement.

29. A machine for producing controllers for typographic machines including in combination a series of key levers, a corresponding series of punches for perforating the controller, common pivotally mounted, reciprocable actuating means for a plurality of said punches, a series of pivotally mounted, reciprocable interponents corresponding to said series of punches and key levers, said interponents being movable into and out of operative position between their respective punches and said punch actuating means, and means upon each key lever for causing said punch actuating means to actuate a punch whose interponent has been previously set and for setting the interponent corresponding to said actuated lever in operative position between its punch and said punch actuating means as said punch actuating means returns from said actuating movement.

30. A machine for producing controllers for typographic machines including in combination a series of key levers, a corresponding series of punches for perforating the controller, restoring means for said punches, common actuating means for a plurality of said punches, a series of interponents corresponding to said punches and key levers movable into and out of operative relation between their respective punches and said punch actuating means, yielding contact means carried upon said interponent for contacting with its punch and for permitting the punch and interponent to pass and move independently of each other, and means upon said key levers for setting their respective interponents in operative position between their respective punches and said punch actuating means.

31. A machine for producing controllers for typographic machines including in combination a series of key levers, a corresponding series of punches for perforating the controller, restoring means for said punches, common actuating means for a plurality of said punches, a series of pivotally mounted, reciprocable interponents corresponding to said punches and key levers movable into and out of operative relation between their respective punches and said punch actuating means, yielding contact means carried upon said interponent for contacting with its punch and for permitting the punch and interponent to pass and move independently of each other, and means upon said key levers for setting their respective interponents in operative position between their respective punches and said punch actuating means.

32. A machine for producing controllers for typographic machines including in combination a series of key levers, a corresponding series of punches for perforating the controller, restoring means for said punches, common pivotally mounted, reciprocable actuating means for a plurality of said punches, a series of interponents corresponding to said punches and key levers movable into and out of operative relation between their respective punches and said punch actuating means, yielding contact means carried upon said interponent for contacting with its punch and for permitting the punch and interponent to pass and move independently of each other, and means upon said key levers for setting their respective interponents in operative position between their respective punches and said punch actuating means.

33. A machine for producing controllers for typographic machines including in combination a series of key levers, a corresponding series of punches for perforating the controller, restoring means for said punches, common pivotally mounted, reciprocable actuating means for a plurality of said punches, a series of pivotally mounted, reciprocable interponents corresponding to said punches and key levers movable into and out of operative relation between their respective punches and said punch actuating means, yielding contact means carried upon said interponent for contacting with its punch and for permitting the punch and interponent to pass and move independently of each other, and means upon said key levers for setting their respective interponents in operative position between their respective punches and said punch actuating means.

34. A machine for producing controllers for typographic machines including in combination a series of key levers, a corresponding series of punches for perforating the controller, restoring means for said punches, common actuating means for a plurality of said punches, a series of interponents corresponding to said punches and key levers movable into and out of operative relation between their respective punches and said contact actuating means, yielding contact means carried upon said interponents for contacting with the head of the punch and permitting the punch and the interponent to pass and to move independently of each other, and yielding contact means between said key lever and said interponent for moving the interponent into operative position between its punch and said actuating means.

35. A machine for producing controllers for typographic machines including in combination a series of key levers, a corresponding series of punches for perforating the controller, restoring means for said punches, common actuating means for a plurality of said punches, a series of reciprocable interponents corresponding to said punches and key levers movable into and out of operative relation between their respective punches and said contact actuating means, yielding contact means carried upon said interponents for contacting with the head of the punch and permitting the punch and the interponent to pass and to move independently of each other, and yielding contact means between said key lever and said interponent for moving the interponent into operative position between its punch and said actuating means.

36. A machine for producing controllers for typographic machines including in combination a series of key levers, a corresponding series of punches for perforating the controller, restoring means for said punches, common actuating means for a plurality of said punches, a series of pivotally mounted, reciprocable interponents corresponding to said punches and key levers movable into and out of operative relation between their respective punches and said contact actuating means, yielding contact means carried upon said interponents for contacting with the head of the punch and permitting the punch and the interponent to pass and to move independently of each other, and yielding contact means between said key lever and said interponent for moving the interponent into operative position between its punch and said actuating means.

87. A machine for producing controllers for typographic machines including in combination a punch for punching the controller, restoring means for said punch, actuating means for said punch, a swinging interponent movable into and out of operative relation between said punch and said actuating means and a movable yielding contact mounted upon said interponent whereby it may pass said punch into operative position between said punch and said actuating means.

38. A machine for producing controllers for typographic machines including in combination a punch for punching the controller, restoring means for said punch, actuating means for said punch, an interponent movable into and out of operative relation between said punch and said actuating means and a movable yielding contact mounted upon said interponent whereby it may pass said punch into operative position between said punch and said actuating means.

39. A machine for producing controllers for typographic machines including in combination a punch for punching the controller, restoring means for said punch, actuating means for said punch, a swinging interponent movable into and out of operative relation between said punch and said actuating means and a movable yielding contact mounted upon said interponent to yield as the interponent swings into position between said punch and said actuating means, said interponent swinging clear of the punch after said punch has been advanced to make the perforation, whereby the punch is restored by said restoring means independently of the further movement of said interponent.

40. A machine for producing controllers for typographic machines including in combination a punch for punching the controller, restoring means for said punch, actuating means for said punch, a moving interponent movable into and out of operative relation between said punch and said actuating means and a movable yielding contact mounted upon said interponent to yield as the interponent moves into position between said punch and said actuating means, said interponent moving clear of the punch after said punch has been advanced to make the perforation, whereby the punch is restored by said restoring means independently of the further movement of said interponent.

41. A machine for producing controllers for typographic machines including in combination a punch for punching the controller, restoring means for said punch, actuating means for said punch, an interponent movable into and out of relation between said punch and said actuating means and a pivoted, spring pressed contact piece mounted upon said interponent and movable to permit the interponent to pass said punch into operative position between said punch and said actuating means.

42. A machine for producing controllers for typographic machines including in combination a punch for punching the controller, restoring means for said punch, actuating means for said punch, a swinging interponent movable into and out of relation between said punch and said actuating means and a pivoted, spring pressed contact piece mounted upon said interponent and movable to permit the interponent to pass said punch into operative position between said punch and said actuating means.

43. A machine for producing controllers for typographic machines including in combination a punch for punching the controller, restoring means for said punch, actuating means for said punch, an interponent movable into and out of relation between said punch and said actuating means and a pivoted, spring pressed contact piece mounted upon said interponent and movable about its pivot and against its spring to permit the interponent to pass said punch into operative position between said punch and said actuating means and with said contact piece in operative relation with the head of the punch, but said contact piece being held against yielding as the punch is pushed forward by the actuating means acting through the interponent.

44. A machine for producing controllers for typographic machines including in combination a series of key levers, a series of punches corresponding therewith, common actuating means for a plurality of said punches, a series of interponents unconnected to said key levers and corresponding to said punches and key levers movable into and out of operative position, each key lever positioning its corresponding interponent in operative position between its punch and said actuating means, means for moving said actuating means to operate the punch, and connections from said lever for controlling said actuating means.

45. A machine for producing controllers for typographic machines including in combination a series of key levers, a series of punches corresponding therewith, common actuating means for a plurality of said punches, a series of interponents corresponding to said punches and key levers movable into and out of operative position, each key lever positioning its corresponding interponent in operative position between its punch and said actuating means, a frictionally driven shaft, connections from said shaft to said punch actuating means, and means holding said shaft from rotation but operable by said key lever to release said shaft.

46. A machine for producing controllers for typographic machines including in combination a series of key levers, a series of punches corresponding therewith, common actuating means for a plurality of said punches, a series of interponents corresponding to said punches and key levers and movable into and out of operative position between said actuating means and the corresponding punch, means for moving said actuating means to operate the punch, and connections whereby a key lever when actuated will first cause said moving means to move said actuating means to operate a punch, and whereby said key lever will then position the interponent corresponding to said actuated key lever into operative relation between its punch and said actuating means.

47. A machine for producing controllers for typographic machines including in combination a slidable punch, restoring means therefor, swinging actuating means therefor, a swinging interponent positionable by a key lever in operative relation between said actuating means and punch, and means upon the key lever for swinging the interponent into such operative position as said actuating means is swinging away from an operated punch.

48. A machine for producing controllers for typographic machines including in combination a series of sliding punches, restoring means therefor, a swinging bail mounted upon a pair of arms, a frictionally driven shaft, an escapement for said shaft, a series of swinging interponents corresponding to said punches and said key levers, and connections whereby an actuated key lever will escape said shaft and will swing an interponent into position between its punch and said bail.

49. A machine for producing controllers for typographic machines including in combination a series of sliding punches, restoring means therefor, a swinging bail mounted upon a pair of arms, a frictionally driven shaft, an escapement for said shaft, a series of swinging interponents corresponding to said punches and said key levers, and connections whereby said key levers will first escape said shaft to actuate said bail, and connections whereby said key lever will swing its interponent into operative position between its punch and said bail as the bail swings backwardly from actuating a punch.

50. A machine for producing controllers for typographic machines including in combination a series of slidable punches, restoring means therefor, a rock shaft, a pair of arms mounted thereon, a bail carried by said arms, an actuating arm fixed to said rock shaft, a frictionally driven shaft, means upon said shaft adapted to engage said actuating arm to rock said shaft, means holding said frictionally driven shaft from rotation, a series of interponents corresponding to said punches and key levers and movable by said key levers into operative position between their respective punches and said bail, and means whereby an actuated key lever causes said holding means to release said frictionally driven shaft to actuate said bail.

51. A machine for producing controllers for typographic machines including in combination a series of slidable punches, restoring means therefor, a rock shaft, a pair of arms mounted thereon, a bail carried by said arms, an actuating arm fixed to said rock shaft, a frictionally driven shaft, means upon said shaft adapted to engage said actuating arm to rock said shaft, means holding said frictionally driven shaft from rotation, a series of swinging interponents corresponding to said punches and key levers and movable by said key levers into operative position between their respective punches and said bail, a contact piece yieldable to permit the interponent to pass its punch and to position said contact piece relatively to said punch but being rigid to actuate said punch to perforate the controller when the interponent is moved in the opposite direction by said bail, said interponents being movable into operative position between its punch and said bail by its key lever, and means whereby an actuated key lever causes said holding means to release said frictionally driven shaft to actuate said bail.

52. A machine for producing controllers for typographic machines including in combination a series of slidable punches, restoring means therefor, a rock shaft, a pair of arms mounted thereon, a bail carried by said arms, an actuating arm fixed to said rock shaft, a frictionally driven shaft, means upon said shaft adapted to engage said actuating arm to rock said shaft, means holding said frictionally driven shaft from rotation, a series of swinging interponents corresponding to said punches and key levers and movable by said key levers into operative position between their respective punches and said bail, a contact piece yieldable to permit the interponent to pass its punch and to position said contact piece relatively to said punch but being rigid to actuate said punch to perforate the controller when the interponent is moved in the opposite direction by said bail, said interponents being movable into operative position between its punch and said bail by its key lever, and means whereby an actuated key lever causes said holding means to release said frictionally driven shaft to actuate said bail before said key lever moves its interponent into operative position between its punch and said bail.

53. A machine for producing controllers for typographic machines including in combination a series of slidable punches, restoring means therefor, a rock shaft, a pair of arms mounted thereon, a bail carried by said arms, an actuating arm fixed to said rock shaft, a frictionally driven shaft, means upon said shaft adapted to engage said actuating arm to rock said shaft, means holding said frictionally driven shaft from rotation, a series of swinging interponents corresponding to said punches and key levers and movable by said key levers into operative position between their respective punches and said bail, a contact piece yieldable to permit the interponent to pass its punch and to position said contact piece relatively to said punch but being rigid to actuate said punch to perforate the controller when the interponent is moved in the opposite direction by said bail, said interponents being movable into operative position between its punch and said bail by its key lever and swinging clear of the punch as said punch slides before the interponent to permit the punch to be restored, and means whereby an actuated key lever causes said holding means to release said frictionally driven shaft to actuate said bail.

54. A machine for producing controllers for typographic machines including in combination a series of punches, actuating means therefor, a series of key levers, a series of interponents corresponding to said punches and key levers, and a sequence determining device controlled by said interponents.

55. A machine for producing controllers for typographic machines including in combination a series of punches, actuating means therefor, a series of key levers, a series of interponents corresponding to said punches and key levers, a sequence determining device controlled by said interponents, and means for moving the controller to correspond to the movements of said sequence determining device.

56. A machine for producing controllers for typographic machines including in combination a series of punches, actuating means therefor, a series of key levers corresponding to said punches, a series of interponents corresponding to said punches and key levers and being movable by their respective key levers into operative position between their respective punches and said actuating means, and a sequence determining device controlled by the successively positioned interponents.

57. A machine for producing controllers for typographic machines including in combination a series of punches, actuating means therefor, a series of key levers corresponding to said punches, a series of interponents corresponding to said punches and key levers and being movable by their respective key levers into operative position between their respective punches and said actuating means, a sequence determining device controlled by the successively positioned interponents, and means for moving the controller to correspond to the movements of said sequence determining device.

58. A machine for producing controllers for typographic machines including in combination a series of punches, actuating means therefor, a series of key levers, a series of interponents corresponding to said punches and key levers, and a rotatable sequence determining device controlled by said interponents.

59. A machine for producing controllers for typographic machines including in combination a series of punches, actuating means therefor, a series of key levers corresponding to said punches, a series of interponents corresponding to said punches and key levers and being movable by their respective key levers into operative position between their respective punches and said actuating means, and a rotatable sequence determining device controlled by the successively positioned interponents.

60. A machine for producing controllers for typographic machines including in combination a series of punches, actuating means therefor, a series of key levers corresponding to said punches, a series of interponents corresponding to said punches and key levers and being movable by their respective key levers into operative position between their respective punches and said actuating means, a movable sequence determining device having a series of stops corresponding to said series of interponents, whereby a positioned interponent arrests the movement of said sequence determining device, and means for moving the controller to correspond to the movements of said sequence determining device.

61. A machine for producing controllers for typographic machines including in combination a series of punches, actuating means therefor, a series of key levers, a series of interponents corresponding to said punches and key levers and being movable by their respective key levers into operative position between their respective punches and said actuating means, a movable sequence determining device having a series of stops corresponding to said series of interponents, and means upon the respective interponents for engaging with the respective stops upon said sequence determining device whereby an interponent positioned by its key lever arrests said sequence determining device in a corresponding position, and means for moving the controller to correspond to the movements of said sequence determining device.

62. A machine for producing controllers for typographic machines including in combination a series of punches, actuating means therefor, a series of key levers, a series of interponents corresponding to said punches and key levers and being movable by their respective key levers into operative position between their respective punches and said actuating means, a rotatable sequence determining device having a series of stops corresponding to said series of interponents, and means upon the respective interponents for engaging with the respective stops upon said sequence determining device whereby an interponent positioned by its key lever arrests said sequence determining device in a corresponding position, and means for moving the controller to correspond to the movements of said sequence determining device.

63. A machine for producing controllers for typographic machines including in combination a series of punches, a series of key levers, a series of interponents corresponding to said punches and key levers and being movable by their respective key levers into operative position between their respective punches and said actuating means, a rotatable sequence determining device mounted upon a frictionally driven shaft, and means whereby a positioned interponent will arrest said sequence determining device in a predetermined position.

64. A machine for producing controllers for typographic machines including in combination a series of punches, a series of key levers, a series of interponents corresponding to said punches and key levers and being movable by their respective key levers into operative position between their respective punches and said actuating means, a rotatable sequence determining device mounted upon a frictionally driven shaft, and means whereby successively positioned interponents will arrest said sequence determining device in different positions in its rotation about its shaft.

65. A machine for producing controllers for typographic machines including in combination a series of punches, a series of key levers, a series of interponents corresponding to said punches and key levers and being movable by their respective key levers into operative position between their respective punches and said actuating means, a rotatable sequence determining device mounted upon a frictionally driven shaft, and means whereby successively positioned interponents will arrest said sequence determining device in different positions in its rotation about its shaft, and connections for moving the controller to correspond to the various movements and positions of said sequence determining device.

66. A machine for producing controllers for typographic machines including in combination a series of punches, actuating means therefor, a series of key levers, a series of interponents corresponding to said punches and key levers, a sequence determining device controlled by said interponents, and means for giving a line feed to the controller for a predetermined movement of the sequence determining device as controlled by said interponents.

67. A machine for producing controllers for typographic machines including in combination a series of punches, actuating means therefor, a series of key levers, a series of interponents corresponding to said punches and key levers, a rotatable sequence determining device controlled by said interponents, and means for giving a line feed to the controller for a predetermined movement of the sequence determining device as controlled by said interponents.

68. A machine for producing controllers for typographic machines including in combination a series of punches, actuating means therefor, a series of key levers, a series of interponents corresponding to said punches and key levers, a rotatable sequence determining device controlled by said interponents, and means for giving a line feed to the controller for each rotation of the sequence determining device.

69. A machine for producing controllers for typographic machines including in combination a series of punches, actuating means therefor, a series of key levers, a series of interponents corresponding to said punches and key levers, a sequence determining device controlled by said interponents, and means for giving a predetermined feed to the controller at the punches for a predetermined movement of the sequence determining devices as controlled by said interponents.

70. A machine for producing controllers for typographic machines including in combination a series of punches, a series of levers to correspond therewith, actuating means for said punches, a series of interponents corresponding to said key levers and punches, a rotatable sequence determining device, a helical series of stops carried thereby, said interponents having means for engaging a particular stop in alinement with an interponent when positioned by its key lever between its punch and said actuating means.

71. A machine for producing controllers for typographic machines including in combination a series of punches, a series of levers to correspond therewith, actuating means for said punches, a series of interponents corresponding to said key levers and punches, a rotatable sequence determining device, a helical series of stops carried thereby, and a stop upon each interponent for engaging a stop in said helical series in alinement with said interponent when said interponent is positioned between its punch and said actuating means.

72. A machine for producing controllers for typographic machines including in combination a series of punches, a series of levers to correspond therewith, actuating means for said punches, a series of interponents corresponding to said key levers and punches, a rotatable frictionally driven sequence determining device, a helical series of stops carried thereby, said interponents having means for engaging a particular stop in alinement with an interponent when positioned by its key lever between its punch and said actuating means.

73. A machine for producing controllers for typographic machines including in combination a series of punches, a series of levers to correspond therewith, actuating means for said punches, a series of interponents corresponding to said key levers and punches, a rotatable frictionally driven sequence determining device, a helical series of stops carried thereby, and a stop upon each interponent for engaging a stop in said helical series in alinement with said interponent when said interponent is positioned between its punch and said actuating means.

74. A machine for producing controllers for typographic machines including in combination a series of punches arranged in a line, actuating means therefor, a series of key levers corresponding to said punches, a series of interponents arranged in a line, the various interponents being movable by their respective key levers into operative position between their respective punches and said actuating means, a rotatable sequence determining device arranged along and contiguous to said series of interponents and a series of stops upon said sequence determining device adapted to be engaged by said interponents to arrest said sequence determining device at different points in its rotation, and connections from said sequence determining device for controlling the movement of the controller at said punches.

75. A machine for producing controllers for typographic machines including in combination a series of punches arranged in a line, actuating means therefor, a series of key levers corresponding to said punches, a series of interponents arranged in a line, the various interponents being movable by their respective key levers into operative position between their respective punches and said actuating means, a rotatable sequence determining device arranged along and contiguous to said series of interponents and carrying a helical series of stops adapted to be engaged by an interponent in alinement with one of said stops when positioned by its key lever, to arrest said sequence determining device at a predetermined point in its rotation, and connections from said sequence determining device for controlling the movement of said controller relatively to said punches.

76. A machine for producing controllers for typographic machines including in combination a series of punches arranged in a line, actuating means therefor, a series of key levers corresponding to said punches, a series of interponents arranged in a line, the various interponents being movable by their respective key levers into operative position between their respective punches and said actuating means, a rotatable sequence determining device arranged along and contiguous to said series of interponents and carrying a helical series of stops upon said sequence determining device corresponding to said series of interponents, and a stop upon each interponent for engaging the sequence stop when the interponent is positioned by its key lever, and connections from said sequence determining device for controlling the movement of the controller relative to said punches.

77. A machine for producing controllers for typographic machines including in combination a rotatable sequence determining device, a series of key levers, a series of interponents corresponding to said key levers, the various interponents being movable by their respective key levers into position to engage said sequence determining device and hold it against rotation.

78. A machine for producing controllers for typographic machines including in combination a rotatable sequence determining device, a series of key levers, a series of interponents corresponding to said key levers, the various interponents being movable by their respective key levers into position to engage said sequence determining device and hold it against rotation, and means for holding said sequence determining device against rotation between the moving of successive interponents into position to engage said sequence determining device.

79. A machine for producing controllers for typographic machines including in combination a rotatable sequence determining device, a series of key levers, a series of interponents corresponding to said key levers, the various interponents being movable by their respective key levers into position to engage said sequence determining device and hold it against rotation, and for leaving 80. A machine for producing controllers for typographic machines including in combination a series of punches, a series of key levers corresponding thereto, actuating means for said punches, a series of interponents corresponding to said punches and said key levers, and movable by said key levers into operative position between said actuating means and their respective punches, a rotatable sequence determining device adjacent to said interponents, a series of stops arranged about said sequence device, stops upon said interponents adapted to coöperate with said stops upon the sequence device to stop said device at different points in its rotation, and means for holding said sequence determining device at rest between the positioning of different interponents by their key levers.

81. A machine for producing controllers for typographic machines including in combination a series of punches, a series of key levers corresponding thereto, actuating means for said punches, a series of interponents corresponding to said punches and said key levers, and movable by said key levers into operative position between said actuating means and their respective punches, a rotatable sequence determining device adjacent to said interponents, a series of stops arranged about said sequence device, stops upon said interponents adapted to coöperate with said stops upon the sequence device to stop said device at different points in its rotation, means for holding said sequence determining device at rest between the positioning of different interponents by their key levers, means for giving a line by line feed to the controller at said punches, and actuating means therefor controlled by the movements of said sequence determining device.

82. A machine for producing controllers for typographic machines including in combination a series of punches, a series of key levers, means for operating said punches selected by said key levers, unit storing means, a unit gage, actuating means for said unit storing means, a series of unit gage interponents corresponding to said key levers, said respective unit gage interponents being movable by their key levers when actuated into operative relation with said unit gage and with said unit storing mechanism to determine the number of units stored against the actuation of said key levers.

83. A machine for producing controllers for typographic machines including in combination a series of punches, a series of key levers, means for operating said punches selected by said key levers, unit storing means, a unit gage, actuating means for said unit storing means, a series of unit gage interponents corresponding to said key levers, said respective unit gage interponents being movable by their key levers when actuated into operative relation with said actuating means for said unit storing device and being movable by said actuating means into engagement with said unit gage to control the number of units stored by the unit storing device.

84. A machine for producing controllers for typographic machines including in combination a series of punches, a series of key levers corresponding thereto, means for operating said punches selected by said key levers, unit storing means, a unit gage, actuating means for said unit storing means, a series of unit gage interponents corresponding to said key levers, and adapted to be swung by their key levers into engagement with said actuating means for the unit storing means and to be slid by said actuating means into engagement with said unit gage to limit the movement of said actuating means.

85. A machine for producing controllers for typographic machines including in combination a series of punches, a series of key levers corresponding thereto, means for operating said punches selected by said key levers, unit storing means, a unit gage, actuating means for said unit storing means, a swinging universal bar connected to said unit storing means, and a series of swinging and slidable unit gage interponents corresponding to said key lever and adapted to coöperate with said swinging bar and said unit gage to determine the number of units stored for said actuated key lever.

86. A machine for producing controllers for typographic machines including in combination a series of punches, a series of key levers corresponding thereto, means for operating said punches selected by said key levers, unit storing means, a unit gage, actuating means for said unit storing means, a swinging universal bar connected to said unit storing means, and a series of swinging and slidable unit gage interponents corresponding to said key lever and adapted to be swung by their respective key levers into engagement with said swinging bar and to be slid by said bar into engagement with the unit gage to determine the number of units stored for said actuated key lever.

87. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, and connections between said unit storing means and said key levers.

88. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, manually operable connections whereby the operator may cause said two shafts to rotate together, and connections between said unit storing means and said key levers.

89. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, manually operable connections whereby the operator may cause said step by step rotation of one shaft with respect to the other, and connections between said unit storing means and said key levers.

90. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, and connections whereby the operator may cause one shaft to rotate independently of the other, and connections between said unit storing means and said key levers.

91. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, manually operable connections whereby the operator may cause said two shafts to rotate together, manually operable connections whereby the operator may cause said step by step rotation of one shaft with respect to the other, and connections between said unit storing means and said key levers.

92. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, manually operable connections whereby the operator may cause said two shafts to rotate together, connections whereby the operator may cause one shaft to rotate independently of the other, and connections between said unit storing means and said key levers.

93. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, manually operable connections whereby the operator may cause said two shafts to rotate together, manually operable connections whereby the operator may cause said step by step rotation of one shaft with respect to the other, connections whereby the operator may cause one shaft to rotate independently of the other, and connections between said unit storing means and said key levers.

94. A machine for producing controllers for typographic machines including in combination a series of punches, a series of key levers corresponding thereto, means for actuating the punches selected by the key levers, unit storing means comprising two shafts, and means for causing said two shafts to rotate together or for giving one shaft a step by step rotation with respect to the other, or permitting one shaft to rotate independently of the other, connections between said unit storing means and said key levers, and automatic locking means for causing said shafts to rotate together.

95. A machine for producing controllers for typographic machines including in combination a series of punches, a series of key levers corresponding thereto, means for actuating the punches selected by the key levers, unit storing means comprising two shafts, means for causing said two shafts to rotate together or for giving one shaft a step by step rotation with respect to the other, or permitting one shaft to rotate independently of the other, manually operable connections whereby the operator may cause said two shafts to rotate together, connections between said unit storing means and said key levers, and automatic locking means for causing said shafts to rotate together.

96. A machine for producing controllers for typographic machines including in combination a series of punches, a series of levers corresponding thereto, means for actuating the punches selected by the key levers, unit storing means comprising a shaft rotatable in proportion to the unit values of the actuated keys, a unit storing bar, and connections between said bar and said shaft for moving the bar in correspondence to the movement of said shaft, or to permit said bar to move independently of said shaft, and means for rotating said shaft when the key levers are actuated.

97. A machine for producing controllers for typographic machines including in combination a series of punches, a series of levers corresponding thereto, means for actuating the punches selected by the key levers, unit storing means comprising a shaft rotatable in proportion to the unit values of the actuated keys, a unit storing bar, and connections between said bar and said shaft for moving the bar in correspondence to the movement of said shaft, or to permit said bar to move independently of said shaft, manually operable means for changing the relation of said unit storing bar to said shaft by unit value steps, and means for rotating said shaft when the key levers are actuated.

98. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, and connections between said unit storing bar and said shaft for moving the bar in correspondence to the movement of said shaft, manually operable means for changing the relation of said unit storing bar to said shaft by unit value steps, and means for rotating said shaft when the key levers are actuated.

99. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, and connections between said unit storing bar and said shaft for moving the bar in correspondence to the movement of said shaft, manually operable means for changing the relation of said unit storing bar to said shaft by unit value steps, means for rotating said shaft when the key levers are actuated, justifying mechanism, and means for controlling the operation of said justifying mechanism by said unit storing bar.

100. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, a restoring spring acting upon said bar, connections between said unit storing bar and said shaft bar moving the bar in correspondence to the movement of said shaft, means for rotating said shaft when the key levers are actuated, and means for disconnecting said bar from said shaft to permit the restoring spring to restore the bar.

101. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, a restoring spring acting upon said bar, connections between said unit storing bar and said shaft for moving the bar in correspondence to the movement of said shaft, means for rotating said shaft when the key levers are actuated, and means for disconnecting said bar from said shaft to permit the restoring spring to restore the bar, and means for giving a step by step retrograde movement to said bar.

102. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, manually operable means for moving said unit storing bar and for disconnecting it from said shaft.

103. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, a device whereby the operator may move said unit storing bar by hand, and connections from said device for disconnecting said unit storing bar from said shaft.

104. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, a device whereby the operator may move said unit storing bar by hand, connections from said device for disconnecting said unit storing bar from said shaft, and a restoring spring for restoring said unit storing bar to initial position when released by said device and while disconnected from said shaft.

105. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, a device whereby the operator may move said unit storing bar by hand, connections from said device for disconnecting said unit storing bar from said shaft, a restoring spring for restoring said unit storing bar to initial position when released by said device and while disconnected from said shaft, and means for again connecting said bar to said shaft.

106. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, manually operable means for moving said unit storing bar and for disconnecting it from said shaft, justifying mechanism, and means for controlling the operation of said justifying mechanism by said unit storing bar.

107. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, a device whereby the operator may move said unit storing bar by hand, connections from said device for disconnecting said unit storing bar from said shaft, justifying mechanism, and means for controlling the operation of said justifying mechanism by said unit storing bar.

108. A machine for producing controllers for typographic machines including in combination a series of punches, a series of key levers corresponding thereto, means for actuating the punches selected by the key levers, unit storing means comprising a shaft rotatable in proportion to the unit values of the actuated keys, a unit storing bar, connections between said unit storing bar and said shaft for moving the bar in correspondence to the movement of said shaft, means for rotating said shaft when the key levers are actuated, a device whereby the operator may move said unit storing bar by hand, connections from said device for disconnecting said unit storing bar from said shaft, a restoring spring for restoring said unit storing bar to initial position when released by said device and while disconnected from said shaft, justifying mechanism, and means for controlling the operation of said justifying mechanism by said unit storing bar.

109. A machine for producing controllers for typographic machines including in combination a series of punches, a series of key levers corresponding thereto, means for operating the punches selected by said key levers, unit storing means comprising a shaft rotatable in proportion to the unit value of the actuated keys, a unit storing bar, connections between said unit storing bar and said shaft for moving said bar in correspondence to the movement of said shaft, means for rotating said shaft when the key levers are actuated, means for connecting and disconnecting said shaft and said bar and an automatic locking device for locking said last-mentioned means in the disconnected position, and manually operable means for releasing said means from said locking device.

110. A machine for producing controllers for typographic machines including in combination a series of punches, a series of key levers corresponding thereto, means for operating the punches selected by said key levers, unit storing means comprising a shaft rotatable in proportion to the unit value of the actuated keys, means for rotating said shaft when the key levers are actuated, a unit storing bar, a shaft moving said unit storing bar, and connections between said shafts whereby they may be rotated together, or whereby said unit bar driving shaft may have a unit movement relatively to said other shaft.

111. A machine for producing controllers for typographic machines including in combination a series of punches, a series of key levers corresponding thereto, means for operating the punches selected by said key levers, unit storing means comprising a shaft rotatable in proportion to the unit value of the actuated keys, means for rotating said shaft when the key levers are actuated, a unit storing bar, a shaft for moving said unit storing bar, and connections between said shafts whereby they may be rotated together, or whereby said unit bar driving shaft may have a unit by unit movement relatively to said other shaft, and whereby said shafts may be disconnected one from the other.

112. A machine for producing controllers for typographic machines including in combination a series of punches, a series of key levers corresponding thereto, means for operating the punches selected by said key levers, unit storing means comprising a shaft rotatable in proportion to the unit value of the actuated keys, means for rotating said shaft when the key levers are actuated, a unit storing bar, a shaft for moving said unit storing bar, and connections between said shafts whereby they may be rotated together, or whereby said unit bar driving shaft may have a unit by unit movement relatively to said other shaft.

113. A machine for producing controllers for typographic machines including in combination a series of key levers having unit values, a unit storing bar, a shaft, connections from said shaft to said key lever for rotating said shaft in correspondence to the unit values of the actuated keys, a shaft for moving said unit storing bar, a toothed wheel fixed to one of said shafts, and an arm mounted upon the other of said shafts to rotate therewith, and means for moving said arm into and out of engagement with said wheel.

114. A machine for producing controllers for typographic machines including in combination a series of key levers having unit values, a unit storing bar, a shaft, connections from said shaft to said key lever for rotating said shaft in correspondence to the unit values of the actuated keys, a shaft for moving said unit storing bar, a toothed wheel fixed to one of said shafts, and a toothed arm mounted upon the other of said shafts to rotate therewith, and means for moving said arm into and out of engagement with said wheel.

115. A machine for producing controllers for typographic machines including in combination a series of key levers having unit values, a unit storing bar, a shaft, connections from said shaft to said key lever for rotating said shaft in correspondence to the unit values of the actuated keys, a shaft for moving said unit storing bar, a toothed wheel fixed to one of said shafts, and an arm mounted upon the other of said shafts to rotate therewith, means for moving said arm into and out of engagement with said wheel, and means for giving said wheel a unit by unit feed when disengaged from said arm.

116. A machine for producing controllers for typographic machines including in combination a series of key levers having unit values, a unit storing bar, a shaft, connections from said shaft to said key lever for rotating said shaft in correspondence to the unit values of the actuated keys, a shaft for moving said unit storing bar, a toothed wheel fixed to one of said shafts, and an arm mounted upon the other of said shafts to rotate therewith, means for moving said arm into and out of engagement with said wheel, an arm mounted upon said wheel carrying shaft to move angularly relatively to said shaft, and means for moving said arm into engagement with said wheel and permitting said wheel and arm to move together unit distances while said first mentioned arm is out of engagement with said wheel.

117. A machine for producing controllers for typographic machines including in combination a series of key levers having unit values, a unit storing bar, a shaft, connections from said shaft to said key lever for rotating said shaft in correspondence to the unit values of the actuated keys, a shaft for moving said unit storing bar, a toothed wheel fixed to one of said shafts, and an arm mounted upon the other of said shafts to rotate with its shaft, an arm mounted upon said wheel carrying shaft to move angularly relatively to said shaft, means for moving said last mentioned arm into and out of engagement with said wheel and permitting said wheel and arm to move together unit distances, and means for moving either of said arms into engagement with said wheel and the other arm out of engagement therewith.

118. A machine for producing controllers for typographic machines including in combination a series of key levers having unit values, a unit storing bar, a shaft, connections from said shaft to said key lever for rotating said shaft in correspondence to the unit values of the actuated keys, a shaft for moving said unit storing bar, a toothed wheel fixed to one of said shafts, and an arm mounted upon the other of said shafts to rotate with its shaft, an arm mounted upon said wheel carrying shaft to move angularly relatively to said shaft, means for moving said last mentioned arm into and out of engagement with said wheel and permitting said wheel and arm to move together unit distances, and means for moving both of said arms out of engagement with said wheel, whereby one of said shafts may rotate independently of the other.

119. A machine for producing controllers for typographic machines including in combination a series of key levers having unit valves, a unit storing bar, a shaft, connections from said shaft to said key lever for rotating said shaft in correspondence to the unit values of the actuated keys, a shaft for moving said unit storing bar, a toothed wheel fixed to one of said shafts, and an arm mounted upon the other of said shafts to rotate with its shaft, an arm mounted upon said wheel carrying shaft to move angularly relatively to said shaft, means for moving said last mentioned arm into and out of engagement with said wheel, and permitting said wheel and arm to move together unit distances, means for moving either of said arms into engagement with said wheel and the other arm out of engagement therewith, and means for moving both of said arms out of engagement with said wheel, whereby one of said shafts may rotate independently of the other.

120. A machine for producing controllers for typographic machines including in combination a controller marking mechanism, a keyboard therefor, a unit storing bar, a justifying mechanism, connections between said unit storing bar and said justifying mechanism whereby either the shortage or surplusage of the composed line with respect to the line measure may be communicated to the justifying mechanism and marked by said mechanism on the controller.

121. A machine for producing controllers for typographic machines including in combination a controller marking mechanism, a keyboard therefor, a unit storing device, a justifying mechanism, connections between said unit storing device and said justifying mechanism whereby either the shortage or surplusage of the composed line with respect to the line measure may be communicated to the justifying mechanism and marked by said mechanism on the controller.

122. A machine for producing controllers for typographic machines including in combination a controller marking mechanism, a keyboard therefor, means for storing the unit values of the composed lines marked on the controller, a justifying mechanism including means for marking said controller to justify the composed lines, means for setting said justification marking means to mark the controller for either plus or minus justification of the word spaces, and connections whereby said setting means are controlled by said unit storing means.

123. A machine for producing controllers for typographic machines including in combination a controller marking mechanism, a keyboard therefor, means for storing the unit values of the composed lines marked on the controller, a justifying mechanism including means for marking said controller to justify the composed lines, means for setting said justification marking means to mark the controller for either plus or minus justification of the word spaces, a member traveling in correspondence to the number of units stored by said unit storing means, a line measure stop, and connections controlled by the relative position of said traveling member and line measuring stop for controlling said setting means to give plus and minus justification as required by the composed line.

124. A machine for producing controllers for typographic machines including in combination a controller marking mechanism, a keyboard therefor, means for storing the unit values of the composed matter marked on the controller, including a traveling unit storing bar, a line measure stop with which said unit storing bar coöperates, a justifying mechanism including means for marking said controller to justify the composed line, means for setting said justification marking means to mark the controller for either plus or minus justification of the word spaces, and connections between said line measure stop and said setting means.

125. A machine for producing controllers for typographic machines including in combination a controller marking mechanism, a keyboard therefor, means for storing the unit values of the composed matter marked on the controller, including a traveling unit storing bar, a line measure stop movable by said unit storing bar if the composed line exceeds the line measure, a justifying mechanism including means for marking the controller to justify the composed line, means for setting said justification marking means to mark the controller for minus justification of the word spaces, and connections between said movable line measure stop and said setting means.

126. A machine for producing controllers for typographic machines including in combination a controller marking mechanism, a keyboard therefor, means for storing the unit values of the composed matter marked on the controller, including a traveling unit storing bar, a line measure stop with which said unit storing bar coöperates, a justifying mechanism including means for marking said controller to justify the composed line, means for setting said justification marking means to mark the controller for either plus or minus justification of the word spaces, connections between said movable line measure stop and said setting means for marking minus justification for a composed line upon the controller, and means controlled by the distance between said unit storing bar and said line measure stop for marking plus justification upon the controller when the composed line is short of the line measure.

127. A machine for producing controllers for typographic machines including in combination a controller marking mechanism, a keyboard therefor, means for storing the unit values of the composed line marked on the controller, a justifying mechanism including a plurality of controller marking devices movable into a plurality of positions for marking plus or minus justification upon the controller, unit storing means for storing the value of the units in a composed line, and means controlled by said unit storing means for moving said justification controller marking means into position to mark either plus or minus justification as required to justify a particular line.

128. A machine for producing controllers for typographic machines including in combination a controller marking mechanism, a keyboard therefor, means for storing the unit values of the composed line marked on the controller, a justifying mechanism including a plurality of controller marking devices movable into position for marking plus or minus justification upon the controller, unit storing means for storing the value of the units in a composed line, and means controlled by said unit storing means for moving said justification marking means, and comprising devices called into action by an underset line to cause said marking means to mark plus justification, and devices called into action by an overset line to cause said marking means to mark minus justification.

129. A machine for producing controllers for typographic machines including in combination a controller marking mechanism, a keyboard therefor, means for storing the unit values of the composed line marked on the controller, a justifying mechanism including a plurality of controller marking devices movable into position for marking plus or minus justification upon the controller, unit storing means for storing the value of the units in a composed line, a line measure stop movable by said unit storing means when a full line is composed, and means for controlling said justification marking means and comprising devices moved by said line measure stop to cause minus justification and including devices movable proportionately to the distance between said unit storing means and said line measure stop to cause plus justification.

130. A machine for producing controllers for typographic machines including in combination a controller marking mechanism, a keyboard therefor, means for storing the unit values of the composed line marked on the controller comprising a traveling unit storing bar, a movable line measure stop in the path of travel of said bar, a justification mechanism for marking the minus justification upon the controller, and means moved by said line measure stop in proportion to the unit values of the line for controlling the marking of minus justification by said justifying mechanism.

131. A machine for producing controllers for typographic machines including in combination a controller marking mechanism, a keyboard therefor, means for storing the unit values of the composed line marked on the controller comprising a traveling unit storing bar, a movable line measure stop in the path of travel of said bar, a justification mechanism for marking the minus justification upon the controller, means moved by said line measure stop in proportion to the unit values of the line for controlling the marking of minus justification by said justifying mechanism, and means for limiting the action of said justifying mechanism to the number of word spaces in the line.

132. A machine for producing controllers for typographic machines including in combination a controller marking mechanism, a keyboard therefor, means for storing the unit values of the composed line marked on the controller comprising a unit storing member moved in correspondence to the stored units, a justification mechanism comprising means for marking the controller for justification, a movable line stop adapted to be moved by said unit storing member when the line measure is exceeded by the composed line, controlling means coöperating with said unit storing member and said justifying mechanism to produce plus justification, and means brought into action by said line measure stop when moved by said unit storing member for causing said controlling means to produce minus justification in the controller.

133. A machine for producing controllers for typographic machines including in combination a controller marking mechanism, a keyboard therefor, means for storing the unit values of the composed line marked on the controller comprising a unit storing bar moved in correspondence to the stored units, a justification mechanism comprising means for marking the controller for justification, a movable line stop adapted to be moved by said unit storing bar when the line measure is exceeded by the composed line, controlling means coöperating with said unit storing bar and said justifying mechanism to produce plus justification, and means brought into action by said line measure stop when moved by said unit storing bar for causing said controlling means to produce minus justification in the controller.

134. A machine for producing controllers for typographic machines including in combination a controller marking mechanism, a keyboard therefor, means for storing the unit values of a composed line, a justifying mechanism comprising a plurality of controller marking members movable into a plurality of positions relative to the controller to place the justification marks thereon, means controlled by said unit storing means for moving said controller marking members step by step from one position to the next with respect to said controller, and means controlled by said unit storing means for moving said controller marking members a plurality of steps at one time.

135. A machine for producing controllers for typographic machines including in combination a controller marking mechanism, a keyboard therefor, means for storing the unit values of a composed line, a justifying mechanism comprising a plurality of controller marking members movable into a plurality of positions relative to the controller to place the justification marks thereon, means controlled by said unit storing means for moving said controller marking members step by step from one position to the next with respect to said controller, means controlled by said unit storing means for moving said controller marking members a plurality of steps at one time, and means coöperating with said unit storing means to cause either of said two last mentioned means to be operative with respect to said controller marking members dependent upon whether the composed line is over or under the line measure.

136. A machine for producing controllers for typographic machines including in combination a controller marking mechanism, a keyboard therefor, means for storing the unit values of a composed line, a justifying mechanism comprising a plurality of controller marking members movable into a plurality of positions relative to the controller to place the justification marks thereon, means controlled by said unit storing means for moving said controller marking members step by step from one position to the next with respect to said controller, and means controlled by said unit storing means for moving said controller marking members a plurality of steps at one time, and means for limiting the action of said moving means for said controller marking members to a number of said members equal to the word spaces in the lines.

137. A machine for producing controllers for typographic machines including in combination a controller marking mechanism, a keyboard therefor, means for storing the unit values of a composed line, a justifying mechanism comprising a plurality of controller marking members movable into a plurality of positions relative to the controller to place the justification marks thereon, means controlled by said unit storing means for moving said controller marking members step by step from one position to the next with respect to said controller, means controlled by said unit storing means for moving said controller marking members a plurality of steps at one time, means coöperating with said unit storing means to cause either of said two last mentioned means to be operative with respect to said controller marking members dependent upon whether the composed line is over or under the line measure, and means for limiting the action of said moving means for said controller marking members to a number of said members equal to the word spaces in the line.

138. A machine for producing controllers for typographic machines including in combination a controller marking mechanism, means for storing the unit values of a composed line, a justifying mechanism comprising a plurality of movable punch carrying slides, and means for permitting a step by step movement of said slides, and connections from said unit storing means for giving a step by step movement to said slides or for permitting said slides to move at once to the farthermost position.

139. A machine for producing controllers for typographic machines including in combination a controller marking mechanism, means for storing the unit values of a composed line, a justifying mechanism comprising a plurality of movable punch carrying slides, means for permitting a step by step movement of said slides, connections from said unit storing means for giving a step by step movement to said slides or for permitting said slides to move at once to the farthermost position, and means for limiting the action of said connections to a number of slides equivalent to the number of word spaces in the composed line.

140. A machine for producing controllers for typographic machines including in combination a controller marking mechanism, means for storing the unit values of a composed line, a justifying mechanism comprising a plurality of movable punch carrying members; means for permitting a step by step movement of said members, and connections from said unit storing means for giving a step by step movement to said members or for permitting said members to move at once to the farthermost position.

141. A machine for producing controllers for typographic machines including in combination a controller marking mechanism, means for storing the unit values of a composed line, a justifying mechanism comprising a plurality of movable punch carrying members, means for permitting a step by step movement of said members, connections from said unit storing means for giving a step by step movement to said members or for permitting said members to move at once to the farthermost position, and means for limiting the action of said connections to a number of members equivalent to the number of word spaces in the composed line.

142. A machine for producing controllers for typographic machines including in combination a controller marking mechanism, means for storing the unit values of a composed line, a justifying mechanism comprising a plurality of spring pressed punch carrying slides movable step by step into a plurality of positions with respect to the controller, detent means for holding said slides and connections from said unit storing means for actuating said detent to give a step by step movement to said slides, and connections from said unit storing means for rendering said actuating connections for said detent means inoperative whereby said slides are permitted to move to their farthermost position.

143. A machine for producing controllers for typographic machines including in combination a controller marking mechanism, means for storing the unit values of a composed line, a justifying mechanism comprising a plurality of movable punch carrying members, means for permitting a step by step movement of said members, and connections from said unit storing means for giving a step by step movement to said members or for permitting said members to move at once to the farthermost position, and means for causing said punch carrying members to mark the controller when so positioned.

144. A machine for producing controllers for typographic machines including in combination a controller marking mechanism, means for storing the unit values of a composed line, a justifying mechanism comprising a plurality of spring pressed punch carrying slides movable step by step into a plurality of positions with respect to the controller, detent means for holding said slides and connections from said unit storing means for actuating said detent to give a step by step movement to said slides, connections from said unit storing means for rendering said actuating connections for said detent means inoperative whereby said slides are permitted to move to their farthermost position, and means for causing said punch carrying members to mark the controller when so positioned.

145. A machine for producing controllers for typograhpic machines including in combination a controller marking mechanism, means for storing the unit values of a composed line, a justifying mechanism comprising a plurality of punch carrying slides, means tending to move said slides, detent means for holding said slides against the action of said moving means, means controlled by said controller marking mechanism for determining the number of punch carrying slides to be called into action, a member adapted to be traveled proportionately to the units stored by said unit storing means, a movable line measure stop in the path of said traveled member, whereby said member moves said stop when a composed line exceeds the line measure, means controlled by said traveled member for causing said detent means to permit a step by step movement of said slides, and means controlled by the movement of said line measure stop by said traveled member for causing said detent means to release said slides.

146. A machine for producing controllers for typographic machines including in combination a controller marking mechanism, means for storing the unit values of a composed line, a justifying mechanism comprising a plurality of movable punch carrying members, means tending to move said members, detent means for holding said members against the action of said moving means, means controlled by said controller marking mechanism for determining the number of punch carrying members to be called into action, a member adapted to be traveled proportionately to the units stored by said unit storing means, a movable line measure stop in the path of said traveled member, whereby said member moves said stop when a composed line exceeds the line measure, means controlled by said traveled member for causing said detent means to permit a step by step movement of said members, and means controlled by the movement of said line measure stop by said traveled member for causing said detent means to release said members.

147. A machine for producing controllers for typographic machines including in combination a controller marking mechanism, means for storing the unit values of a composed line, a justifying mechanism comprising a plurality of punch carrying slides, means tending to move said slides, detent means for holding said slides against the action of said moving means, means controlled by said controller marking mechanism for determining the number of punch carrying slides to be called into action, a member adapted to be traveled proportionately to the units stored by said unit storing means, a movable line measure stop in the path of said traveled member, whereby said member moves said stop when a composed line exceeds the line measure, reciprocating means controlled by said traveled member for causing said detent means to permit a step by step movement of said slides, and means controlled by the movement of said line measure stop by said traveled member for causing said detent means to release said slides.

148. A machine for producing controllers for typographic machines including in combination a controller marking mechanism, means for storing the unit values of a composed line, a justifying mechanism comprising a plurality of punch carrying slides, means tending to move said slides, detent means for holding said slides against the action of said moving means, means controlled by said controller marking mechanism for determining the number of punch carrying slides to be called into action, a member adapted to be traveled proportionately to the units stored by said unit storing means, a movable line measure stop in the path of said traveled member, whereby said member moves said stop when a composed line exceeds the line measure, manually reciprocable means connected to said traveled member for causing at each successive reciprocation a step by step movement of said slides, and means controlled by the movement of said line measure stop by said traveled member for causing said detent means to release said slides.

149. A machine for producing controllers for typographic machines including in combination a controller marking mechanism, means for storing the unit values of a composed line, a justifying mechanism comprising a plurality of punch carrying slides, means tending to move said slides, detent means for holding said slides against the action of said moving means, means controlled by said controller marking mechanism for determining the number of punch carrying slides to be called into action, a member adapted to be traveled proportionately to the units stored by said unit storing means, a movable line measure stop in the path of said traveled member whereby said member moves said stop when a composed line exceeds the line measure, means controlled by said traveled member for causing said detent means to permit a step by step movement of said slides, and means controlled by the movement of said line measure stop for coöperating with said reciprocable means for releasing said punch carrying members from said detent means.

150. In a justifying mechanism for a controller marking mechanism a plurality of punch carrying slides, a word space rack, detents for said respective slides, means impelling said slides to move against their detents, a justifying rack and a minusing slide adapted to be actuated by said justifying rack to release said slides from their detents.

151. In a justifying mechanism for a controller marking machine a plurality of punch carrying members, a work space rack, detents for said respective members, means impelling said members to move against their detents, a justifying rack and a minusing member adapted to be actuated by said justifying rack to release said member from their detents.

152. A machine for producing controllers for typographic machines including in combination a controller marking mechanism, means for storing the unit values of a composed line comprising a traveling unit storing bar, a justifying mechanism comprising a plurality of punch carrying slides, means tending to move said slides, detent means for holding said slides against the action of said moving means, a reciprocating justifying rack for causing said detent means to permit a step by step movement of said punch carrying slides, connections between said justifying rack and said unit storing bar, a word space rack connected to said controller marking mechanism, means thereon for limiting the reciprocatory movement of said justifying rack, means connected to said unit storing bar and said justifying rack for traveling said unit storing bar and reciprocating said justifying rack proportionately to its travel, a movable line unit stop, and a member traveled thereby successively into operative position with one punch carrying slide after another for causing said justifying rack to release said slides from their detents.

153. A machine for producing controllers for typographic machines including in combination a controller marking mechanism, means for storing the unit values of a composed line, a justifying mechanism comprising a plurality of punch carrying slides, means tending to move said slides, detent means for holding said slides against the action of said moving means, means controlled by said controller marking mechanism for determining the number of punch carrying slides to be called into action, means for holding said line measure stop against movement, a member adapted to be traveled proportionately to the units stored by said unit storing means, a movable line measure stop in the path of said traveled member whereby said member moves said stop when a composed line exceeds the line measure, means controlled by said traveled member for causing said detent means to permit a step by step movement of said slides, and means controlled by the movement of said line measure stop by said traveled member for causing said detent means to release said slides.

154. A machine for producing controllers for typographic machines including in combination a controller marking mechanism, means for storing the unit values of a composed line, a justifying mechanism comprising a plurality of punch carrying slides, means tending to move said slides, detent means for holding said slides against the action of said moving means, means controlled by said controller marking mechanism for determining the number of punch carrying slides to be called into action, means for holding said line measure stop against movement only before it is moved by said traveled member, a member adapted to be traveled proportionately to the units stored by said unit storing means, a movable line measure stop in the path of said traveled member whereby said member moves said stop when a composed line exceeds the line measure, means controlled by said traveled member for causing said detent means to permit a step by step movement of said slides, and means controlled by the movement of said line measure stop by said traveled member for causing said detent means to release said slides.

155. A machine for producing controllers for typographic machines including in combination a controller marking mechanism, means for storing the unit values of a composed line, comprising a traveling unit storing bar, a justifying mechanism comprising a plurality of punch carrying slides, means tending to move said slides, detent means for holding said slides against the action of said moving means, a reciprocating justifying rack for causing said detent means to permit a step by step movement of said punch carrying slides, connections between said justifying rack and said unit storing bar, a word space rack connected to said controller marking mechanism, means thereon for limiting the reciprocatory movement of said justifying rack, manually reciprocable means connected to said unit storing bar and said justifying rack for traveling said unit storing bar and reciprocating said justifying rack proportionately to its travel, a movable line unit stop, and a member traveled thereby successively into operative position with one punch carrying slide after another for causing said justifying rack to release said slides from their detents.

156. A machine for producing controllers for typographic machines including in combination a key lever, a punch, actuating devices for said punch including a member movable into operative position relatively to the punch by said key lever, a yielding contact between said key lever and said movable member, and controller feeding means adapted to hold the controller at rest while being perforated and to hold it at rest or to cause it to feed after the actuation of said key.

157. A machine for producing controllers for typographic machines including in combination a key lever, a punch, actuating devices for said punch including a member movable into operative position relatively to the punch by said key lever, a spring pressed contact between said key lever and said movable member, and controller feeding means adapted to hold the controller at rest while being perforated and to hold it at rest or to cause it to feed after the actuation of said key.

158. A machine for producing controllers for typographic machines including in combination a key lever, a punch, actuating devices for said punch including a member movable into operative position relatively to the punch by said key lever, a pivoted, spring pressed contact mounted upon said key lever, and adapted to engage said movable member to position it relatively to said punch, and controller feeding means adapted to hold the controller at rest while being perforated and to hold it at rest or to cause it to feed after the actuation of said key.

159. A machine for producing controllers for typographic machines including in combination a key lever, a punch, actuating devices for said punch including an interponent movable into operative position relatively to the punch by said key lever, and a contact member carried by said key lever and unconnected to said interponent for moving said interponent.

160. A machine for producing controllers for typographic machines including in combination a key lever pivoted intermediately its ends, a punch, actuating devices for said punch including an interponent movable into operative position relatively to the punch by said key lever, and a contact member carried by said key lever at a distance from its pivot point and unconnected to said interponent for moving said interponent.

161. A machine for producing controllers for typographic machines including in combination a key lever, a punch, actuating devices for said punch including an interponent movable into operative position relatively to the punch by said key lever, and a contact member carried by said key lever at a distance from its pivot point, and unconnected to said interponent for moving said interponent.

162. A machine for producing controllers for typographic machines including in combination a key lever, a punch, actuating devices for said punch including a member movable into operative position relatively to the punch by said key lever, and a yielding contact between said key lever and said movable member, said contact being yieldingly attached to the key lever.

163. A machine for producing controllers for typographic machines including in combination a key lever, a punch, actuating devices for said punch including a member movable into operative position relatively to the punch by said key lever and a yielding contact between said key lever and said movable member, said contact being yieldingly attached to the key lever, and being unconnected to said movable member.

164. A machine for producing controllers for typographic machines including in combination a key lever, a punch, actuating devices for said punch including a member movable into operative position relatively to the punch by said key lever and a pivoted and spring pressed contact between said key lever and said movable member, said contact member being unconnected to said movable member.

165. A machine for producing controllers for typographic machines including in combination a key lever, a punch, actuating devices for said punch including an interponent movable into operative position relatively to the punch by said key lever, and a contact member pivoted on said key lever away from the pivot point of the key lever for so moving the interponent.

166. A machine for producing controllers for typographic machines including in combination a key lever pivoted intermediately its ends, a punch, actuating devices for said punch including an interponent movable into operative position relatively to the punch by said key lever, and a contact member pivoted on said key lever away from the pivot point of the key lever for so moving the interponent.

167. A machine for producing controllers for typographic machines including in combination a key lever, a punch, actuating devices for said punch including an interponent movable into operative position relatively to the punch by said key lever, and a contact member pivoted on said key lever away from the pivot point of the key lever and spring connected to the key lever for so moving the interponent.

168. A machine for producing controllers for typographic machines including in combination a key lever, a punch, actuating devices for said punch including a rigid interponent movable into operative position relatively to the punch by said key lever, and a contact member pivoted on said key lever away from the pivot point of the key lever for so moving the interponent.

169. A machine for producing controllers for typographic machines including in combination a key lever, a punch, actuating devices for said punch including a pivoted interponent movable into operative position relatively to the punch by said key lever, and a contact member pivoted on said key lever away from the pivot point of the key lever for so moving the interponent.

170. A machine for producing controllers for typographic machines including in combination a key lever pivoted intermediately its ends, a punch, actuating devices for said punch including a rigid pivoted interponent movable into operative position relatively to the punch by said key lever, and a contact member pivoted on said key lever away from the pivot point of the key lever for so moving the interponent.

171. A machine for producing controllers for typographic machines including in combination a key lever, a punch, actuating devices for said punch including a rigid interponent movable into operative position relatively to the punch by said key lever, said interponent having a yielding member mounted thereon for engaging the punch to actuate it, and a contact member pivoted on said key lever away from the pivot point of the key lever for so moving the interponent.

172. A machine for producing controllers for typographic machines including in combination a key lever, a punch, actuating devices for said punch including a rigid interponent movable into operative position relatively to the punch by said key lever, said interponent having a movable member mounted thereon for engaging the punch to actuate it, and a contact member pivoted on said key lever away from the pivot point of the key lever for so moving the interponent.

173. A machine for producing controllers for typographic machines including in combination a key lever pivoted intermediately its ends, a punch, actuating devices for said punch including a rigid pivoted interponent movable into operative position relatively to the punch by said key lever, said interponent having a yielding member mounted thereon for engaging the punch to actuate it, and a contact member pivoted on said key lever away from the pivot point of the key lever for so moving the interponent.

174. A machine for producing controllers for typographic machines including in combination a key lever pivoted intermediately its ends, a punch, actuating devices for said punch including a rigid pivoted interponent movable into operative position relatively to the punch by said key lever, said interponent having a movable member mounted thereon for engaging the punch to actuate it, and a contact member pivoted on said key lever away from the pivot point of the key lever for so moving the interponent.

175. A machine for producing controllers for typographic machines including in combination a key lever, a punch, actuating devices for said punch including an interponent movable into operative position relatively to the punch by said key lever, and a contact member movably mounted on said key lever away from its pivot point for moving the interponent.

176. A machine for producing controllers for typographic machines including in combination a pivoted key lever, a punch, punch actuating devices including an interponent movable into operative position or actuation of said key lever and movable out of such operative position after a single actuation thereof and a member movably mounted on said key lever away from its pivot point for moving said interponent into actuating position.

177. A machine for producing controllers for typographic machines including in combination a pivoted key lever, a punch, punch actuating devices including an interponent movable into operative position or actuation of said key lever and movable out of such operative position after a single actuation thereof and a member movably mounted on said key lever away from its pivot point for engaging and moving said interponent into actuating position.

178. A machine for producing controllers for typographic machines including in combination a series of key levers, a series of punches, punch actuating means, a series of interponents corresponding to said series of punches and key levers, each interponent being settable by its key lever into operative relation between its punch and said punch actuating means whereby the punch may be actuated by said actuating means to perforate the controller, and controller feeding means adapted to feed or not feed the controller after the actuation of a punch.

179. A machine for producing controllers for typographic machines including in combination a punch, reciprocable in a straight path, a rocking interponent having a moving member acting directly on said punch to actuate it in one direction of movement of the interponent, a key lever directly engaging said interponent to move it into position relatively to the punch, and actuating means for the interponent.

180. A machine for producing controllers for typographic machines including in combination a punch reciprocable in a straight path, a rocking interponent having a moving member acting directly on said punch to actuate it in one direction of movement of the interponent, a key lever, having a resilient part directly engaging said interponent to move it into position relatively to the punch and actuating means for the interponent.

181. A machine for producing controllers for typographic machines including in combination a series of key levers, a series of punches corresponding therewith, common actuating means for a plurality of said punches, a series of interponents corresponding to said punches and key levers movable into and out of operative position, each key lever positioning its corresponding interponent in operative position between its punch and said actuating means, a frictionally driven shaft, connections from said shaft to said punch actuating means, and means holding said shaft from rotation but operable by said key lever to release said shaft, and means adapted to feed or not to feed the controller after the actuation of a key lever.

182. A machine for producing controllers for typographic machines including in combination a key lever, a punch, a punch actuating device and an interponent unconnected to but engaged and movable by the key lever into position to cause the punch actuating device to actuate the punch.

183. A machine for producing controllers for typographic machines including in combination a key lever, a punch, a punch actuating device and an interponent unconnected to but engaged by and movable into position between the head of the punch and the punch actuating device to communicate the movement of the actuating device to the punch.

184. A machine for producing controllers for typographic machines including in combination a key lever, a spring restored punch, a punch actuating device and an interponent unconnected to but movable into position between the head of the punch and the punch actuating device to communicate the movement of the actuating device to the punch, said interponent being adapted to move sidewise off the head of the punch to permit the punch to return under the impulsion of its spring independently of the further movement of said interponent.

185. A machine for producing controller strips for typographic machines including in combination a key lever, a punch, a punch actuating device, an interponent movable by the key lever into position to cause the punch actuating device to actuate the punch, and means for feeding the strip a distance greater than the size of the perforations made by the punch.

186. A machine for producing controller strips for typographic machines including in combination a plurality of key levers, a plurality of punches, a common punch actuator for said plurality of punches, and a plurality of interponents directly engaged by the key levers to be moved into position to cause the punch actuator to actuate the corresponding punches.

187. A machine for producing controller strips for typographic machines including in combination a plurality of key levers, a plurality of punches, a common actuator for said punches, and a plurality of pivoted interponents directly engaged by said key levers to be moved into position to cause the punch actuator to actuate the corresponding punches.

188. A machine for producing controller strips for automatic typographic machines including in combination a plurality of key levers, a plurality of punches, a common actuator for said plurality of punches, a plurality of interponents directly engaged by the key levers to be moved into position between the punches and the punch actuator and to be moved by the actuator to actuate the punch.

189. A machine for producing controller strips for automatic typographic machines including in combination a plurality of key levers, a plurality of punches, a common actuator for said plurality of punches, a plurality of pivoted interponents directly engaged by the key levers to be moved into position between the punches and the punch actuator and to be moved by the actuator to actuate the punch.

190. A machine for producing controller strips for automatic typographic machines including in combination a plurality of key levers, a plurality of punches, a common pivoted actuator for said plurality of punches, a plurality of interponents directly engaged by the key levers to be moved into position between the punches and the punch actuator and to be moved by the actuator to actuate the punch.

191. A machine for producing controller strips for automatic typographic machines including in combination a plurality of key levers, a plurality of punches, a common pivoted actuator for said plurality of punches, a plurality of pivoted interponents directly engaged by the key levers to be moved into position between the punches and the punch actuator and to be moved by the actuator to actuate the punch.

192. A machine for producing controller strips for automatic typographic machines including in combination a plurality of key levers, a plurality of reciprocable punches, a common actuator for said plurality of punches, a plurality of interponents directly engaged by the key levers to be moved into position between the punches and the punch actuator and to be moved by the actuator to actuate the punch.

193. A machine for producing controller strips for automatic typographic machines including in combination a plurality of key levers, a plurality of reciprocable, spring pressed punches, a common actuator for said plurality of punches, a plurality of interponents directly engaged by the key levers to be moved into position between the punches and the punch actuator and to be moved by the actuator to actuate the punch.

194. A machine for producing controller strips for automatic typographic machines including in combination a plurality of key levers, a plurality of reciprocable punches, a common actuator for said plurality of punches, a plurality of pivoted interponents directly engaged by the key levers to be moved into position between the punches and the punch actuator and to be moved by the actuator to actuate the punch.

195. A machine for producing controller strips for automatic typographic machines including in combination a plurality of key levers, a plurality of reciprocable, spring pressed punches, a common actuator for said plurality of punches, a plurality of pivoted interponents directly engaged by the key levers to be moved into position between the punches and the punch actuator and to be moved by the actuator to actuate the punch.

196. A machine for producing controller strips for automatic typographic machines including in combination a plurality of key levers, a plurality of reciprocable punches, a common pivoted actuator for said plurality of punches, a plurality of interponents directly engaged by the key levers to be moved into position between the punches and the punch actuator and to be moved by the actuator to actuate the punch.

197. A machine for producing controller strips for automatic typographic machines including in combination a plurality of key levers, a plurality of reciprocable, spring pressed punches, a common pivoted actuator for said plurality of punches, a plurality of interponents directly engaged by the key levers to be moved into position between the punches and the punch actuator and to be moved by the actuator to actuate the punch.

198. A machine for producing controller strips for automatic typographic machines including in combination a plurality of key levers, a plurality of reciprocable punches, a common pivoted actuator for said plurality of punches, a plurality of pivoted interponents directly engaged by the key levers to be moved into position between the punches and the punch actuator and to be moved by the actuator to actuate the punch.

199. A machine for producing controller strips for automatic typographic machines including in combination a plurality of key levers, a plurality of reciprocable, spring pressed punches, a common pivoted actuator for said plurality of punches, a plurality of pivoted interponents directly engaged by the key levers to be moved into position between the punches and the punch actuator and to be moved by the actuator to actuate the punch.

200. A machine for producing controller strips for typographic machines including in combination a plurality of key levers, a plurality of reciprocable, spring pressed punches, a common actuator for said plurality of punches, a plurality of interponents movable by said key levers into position to be moved by said actuator to actuate the punches, and connections whereby said punches may return irrespective of the return movement of said interponents.

201. A machine for producing controller strips for typographic machines including in combination a plurality of key levers, a plurality of punches one for each key lever, a plurality of interponents one for each key lever, each interponent being settable by its particular key lever, and means for actuating said set interponent to operate its punch.

202. A machine for producing controller strips for typographic machines including in combination a plurality of key levers, a plurality of punches one for each key lever, a plurality of interponents one for each key lever, each interponent being settable by its particular key lever, and actuating means common to said plurality of interponents for actuating any set interponent to actuate its punch.

203. A machine for producing controller strips for typographic machines including in combination a key lever, a punch, a punch actuating device, and an interponent movable only by said key lever into position to cause the punch actuating device to operate the punch.

204. A machine for producing controller strips for typographic machines including in combination a key lever, a punch, a punch actuating device, and a pivotally mounted interponent movable only by said key lever into position to cause the punch actuating device to operate the punch.

205. A machine for producing controller strips for typographic machines including in combination a key lever, a reciprocable punch, a punch actuating device, and an interponent movable only by said lever into position to cause the punch actuating device to operate the punch.

206. A machine for producing controller strips for typographic machines including in combination a key lever, a reciprocable punch, a punch actuating device, and a pivotally mounted interponent movable only by said key lever into position to cause the punch actuating device to operate the punch.

207. A machine for making controller strips for typographic machines including in combination a plurality of key levers, a plurality of punches, a common actuator for said plurality of punches, a plurality of interponents movable by said key levers into position to be actuated by said actuator, and means for causing said actuator to actuate each successive set interponent.

208. A machine for making controller strips for typographic machines including in combination a plurality of key levers, a plurality of punches, a common actuator for said plurality of punches, a plurality of interponents movable by said key levers into position to be actuated by said actuator, and means for causing said actuator to actuate each single interponent as it is set.

209. A machine for making controller strips for typographic machines including in combination a plurality of key levers, a plurality of punches, a common actuator for said plurality of punches, a plurality of interponents movable by said key levers into position to be actuated by said actuator, means for causing said actuator to actuate each successive set interponent, and strip feeding means operating intermittently after either a single punching or a plurality of punchings of the strip dependent upon the sequence of key levers operated.

210. A machine for making controller strips for typographic machines including in combination a plurality of key levers, a plurality of punches, a common actuator for said plurality of punches, a plurality of interponents movable by said key levers into position to be actuated by said actuator, means for causing said actuator to actuate each successive set interponent, and strip feeding means operating automatically intermittently after either a single punching or a plurality of punchings of the strip dependent upon the sequence of key levers operated.

211. A machine for producing controller strips for typographic machines including in combination a key lever, a spring restored punch, and means actuated by the key lever for engaging and pushing the punch to perforate the strip, said means sliding off the punch to permit the restoration of the punch by its spring independently of said pushing means.

212. A machine for producing controllers or typographic machines including in combination a series of key levers, a series of punches corresponding therewith, common actuating means for said punches, a series of interponents corresponding to said punches and key levers and being movable into and out of operative position, each key lever positioning its corresponding interponent in operative position between its punch and said actuating means, a shaft for operating said actuating means, and means holding said shaft from rotation but operable by the key levers to release the shaft.

213. A machine for producing controller strips for typographic machines including in combination a key lever, a punch, a punch actuator, an interponent movable by the key lever into operative relation with said punch and punch actuator, and operating means for said punch actuator released by the key lever.

214. A machine for producing controller strips for typographic machines including in combination a series of punches, a series of interponents, and a sequence counter having a series of helical stops coöperating therewith.

In testimony whereof, I have signed my name to this specification, in the presence of two subscribing witnesses.

WILLIAM H. LONG.

Witnesses:
John D. Morgan,
Rose Menk.